(12) United States Patent
Anilkumar et al.

(10) Patent No.: US 11,783,448 B2
(45) Date of Patent: *Oct. 10, 2023

(54) EFFICIENT PARALLEL OPTICAL FLOW ALGORITHM AND GPU IMPLEMENTATION

(71) Applicant: Snap Inc., Santa Monica, CA (US)

(72) Inventors: Shah Tanmay Anilkumar, Los Angeles, CA (US); Samuel Edward Hare, Los Angeles, CA (US); Guohui Wang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 17/328,689

(22) Filed: May 24, 2021

(65) Prior Publication Data
US 2021/0279842 A1    Sep. 9, 2021

Related U.S. Application Data

(63) Continuation of application No. 16/392,138, filed on Apr. 23, 2019, now Pat. No. 11,030,721.
(Continued)

(51) Int. Cl.
*G06T 3/40* (2006.01)
*G06T 5/50* (2006.01)
(Continued)

(52) U.S. Cl.
CPC .............. *G06T 3/4076* (2013.01); *G06T 5/50* (2013.01); *G06T 7/11* (2017.01); *G06T 7/174* (2017.01);
(Continued)

(58) Field of Classification Search
CPC . G06T 7/00; G06T 3/4076; G06T 7/11; G06T 7/174; G06T 2207/10016; G06T 2207/20016; G06T 2207/20224
See application file for complete search history.

(56) References Cited

U.S. PATENT DOCUMENTS

| 7,706,583 B2* | 4/2010 | Takei ..................... H04N 19/48 |
| | | 382/248 |
| 11,030,721 B2 | 6/2021 | Anilkumar et al. |
| | | (Continued) |

FOREIGN PATENT DOCUMENTS

| CN | 112041887 A | 12/2020 |
| JP | 2009171498 A | 7/2009 |
| | (Continued) | |

OTHER PUBLICATIONS

U.S. Appl. No. 16/392,138 U.S. Pat. No. 11,030,721, filed Apr. 23, 2019, Efficient Parallel Optical Flow Algorithm and GPU Implementation.

(Continued)

*Primary Examiner* — Santiago Garcia
(74) *Attorney, Agent, or Firm* — Schwegman Lundberg & Woessner, P.A.

(57) ABSTRACT

Systems and methods are provided for initiating transfer of image data corresponding to at least one predetermined level of an image pyramid comprising higher resolution to a graphic processing unit (GPU) of the computing device, calculating, by the central processing unit (CPU) of the computing device, optical flow of at least one predetermined coarse level of the image pyramid, transferring, by the CPU of the computing device, the calculated optical flow of the at least one predetermined coarse level of the image pyramid to the GPU, calculating, by the GPU of the computing device, the optical flow of the at least one predetermined level of the image pyramid comprising higher resolution, and outputting, by the GPU of the computing device, the optical flow of the image data.

20 Claims, 15 Drawing Sheets

Related U.S. Application Data

(60) Provisional application No. 62/661,958, filed on Apr. 24, 2018.

(51) Int. Cl.
    *G06T 7/11*     (2017.01)
    *G06T 7/174*     (2017.01)

(52) U.S. Cl.
    CPC ............ *G06T 2207/10016* (2013.01); *G06T 2207/20016* (2013.01); *G06T 2207/20224* (2013.01)

(56) References Cited

U.S. PATENT DOCUMENTS

| | | | |
|---|---|---|---|
| 2006/0177103 A1* | 8/2006 | Hildreth | G06F 3/0346 348/208.99 |
| 2007/0196007 A1* | 8/2007 | Chen | A61B 6/00 382/131 |
| 2008/0112649 A1* | 5/2008 | Chen | G06V 10/24 382/302 |
| 2012/0268622 A1* | 10/2012 | Hildreth | G06F 1/1686 348/222.1 |
| 2014/0064632 A1* | 3/2014 | Manabe | H04N 23/741 382/254 |
| 2014/0139639 A1* | 5/2014 | Wagner | H04N 13/204 348/46 |
| 2014/0369557 A1* | 12/2014 | Kayombya | G06T 7/73 382/103 |
| 2017/0068571 A1* | 3/2017 | Lu | G06F 9/5016 |
| 2017/0084006 A1* | 3/2017 | Stewart | G06T 5/002 |
| 2017/0295325 A1* | 10/2017 | Yoon | H04N 5/265 |
| 2018/0239948 A1* | 8/2018 | Rutschman | G06T 7/20 |
| 2018/0293737 A1* | 10/2018 | Sun | G06T 7/207 |
| 2018/0300880 A1* | 10/2018 | Fan | G06V 20/582 |
| 2018/0333120 A1* | 11/2018 | Wang | G06T 7/269 |
| 2018/0333123 A1* | 11/2018 | Wang | A61B 6/507 |
| 2019/0120955 A1* | 4/2019 | Zhong | G06V 20/58 |
| 2019/0325561 A1 | 10/2019 | Anilkumar et al. | |
| 2019/0385288 A1* | 12/2019 | Stewart | G06T 5/002 |

FOREIGN PATENT DOCUMENTS

| | | | |
|---|---|---|---|
| JP | 2014194797 A | 10/2014 | |
| JP | 2014527210 A | 10/2014 | |
| KR | 20110111362 A | 10/2011 | |
| KR | 101643672 B1 | 7/2016 | |
| WO | WO-2019209833 A1 | 10/2019 | |

OTHER PUBLICATIONS

"U.S. Appl. No. 16/392,138, Non Final Office Action dated Oct. 13, 2020", 8 pgs.

"U.S. Appl. No. 16/392,138, Notice of Allowance dated Feb. 3, 2021", 7 pgs.

"U.S. Appl. No. 16/392,138, PTO Response to Rule 312 Communication dated Apr. 29, 2021", 2 pgs.

"U.S. Appl. No. 16/392,138, Response filed Dec. 21, 20 to Non Final Office Action dated Oct. 13, 2020", 12 pgs.

"International Application Serial No. PCT/US2019/028732, International Preliminary Report on Patentability dated Nov. 5, 2020", 9 pgs.

"International Application Serial No. PCT/US2019/028732, International Search Report dated Sep. 18, 2019", 4 pgs.

"International Application Serial No. PCT/US2019/028732, Written Opinion dated Sep. 18, 2019", 7 pgs.

Duvenhage, Bernhardt, et al., "Implementation of the Lucas-Kanade Image Registration Algorithm on a GPU for 3D Computational Platform Stabilisation", Computer Graphics, Virtual Reality, Visualisation and Interaction in Africa, ACM, New York, USA, (Jun. 21, 2010), 8 pgs.

Kroeger, Till, et al., "Fast Optical Flow using Dense Inverse Search", arXiv:1603.03590v1, (Mar. 11, 2016), 25 pgs.

Mahmoudi, S A, et al., "Real-time motion tracking using optical flow on multiple GPUs", Bulletin of the Polish Academy of Sciences. Technical Sciences,vol. 62, No. 1, (Mar. 1, 2014), 12 pgs.

Van Der Jeught, Sam, et al., "Correction of deformed images in real time", 22nd Congress of the International Commission for Optics: Light for the Development of the World, SPIE, Bellingham, WA, USA, (Sep. 15, 2011), 7 pgs.

"European Application Serial No. 19731361.2, Response filed May 27, 21 to Communication pursuant to Rules 161(1) and 162 EPC dated Dec. 1, 2020", 21 pgs.

"European Application Serial No. 19731361.2, Voluntary Amendment filed Jun. 2, 2021", 9 pgs.

"Korean Application Serial No. 10-2020-7033347, Notice of Preliminary Rejection dated Oct. 20, 2022", W/English Translation, 4 pgs.

"Korean Application Serial No. 10-2020-7033347, Response filed Nov. 29, 2022 to Notice of Preliminary Rejection dated Oct. 20, 2022", w/ English Claims, 23 pgs.

* cited by examiner

EFFICIENT PARALLEL OPTICAL FLOW ALGORITHM AND GPU IMPLEMENTATION

PRIORITY

This application is a continuation of and claims the benefit of priority of U.S. patent application Ser. No. 16/392,138, filed Apr. 23, 2019, which claims the benefit of priority to U.S. Provisional Patent Application Ser. No. 62/661,958, filed on Apr. 24, 2018, the benefit of each of which are claimed hereby, and which are incorporated by reference herein in their entireties.

BACKGROUND

Optical flow is an important computer vision algorithm used for object detection and tracking, motion estimation, visual odometry, and so on. A typical optical flow algorithm, however, is very computationally intensive and requires a lot of computing resources and time. This prevents the optical flow algorithm from being used and deployed on certain devices, such as mobile devices.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
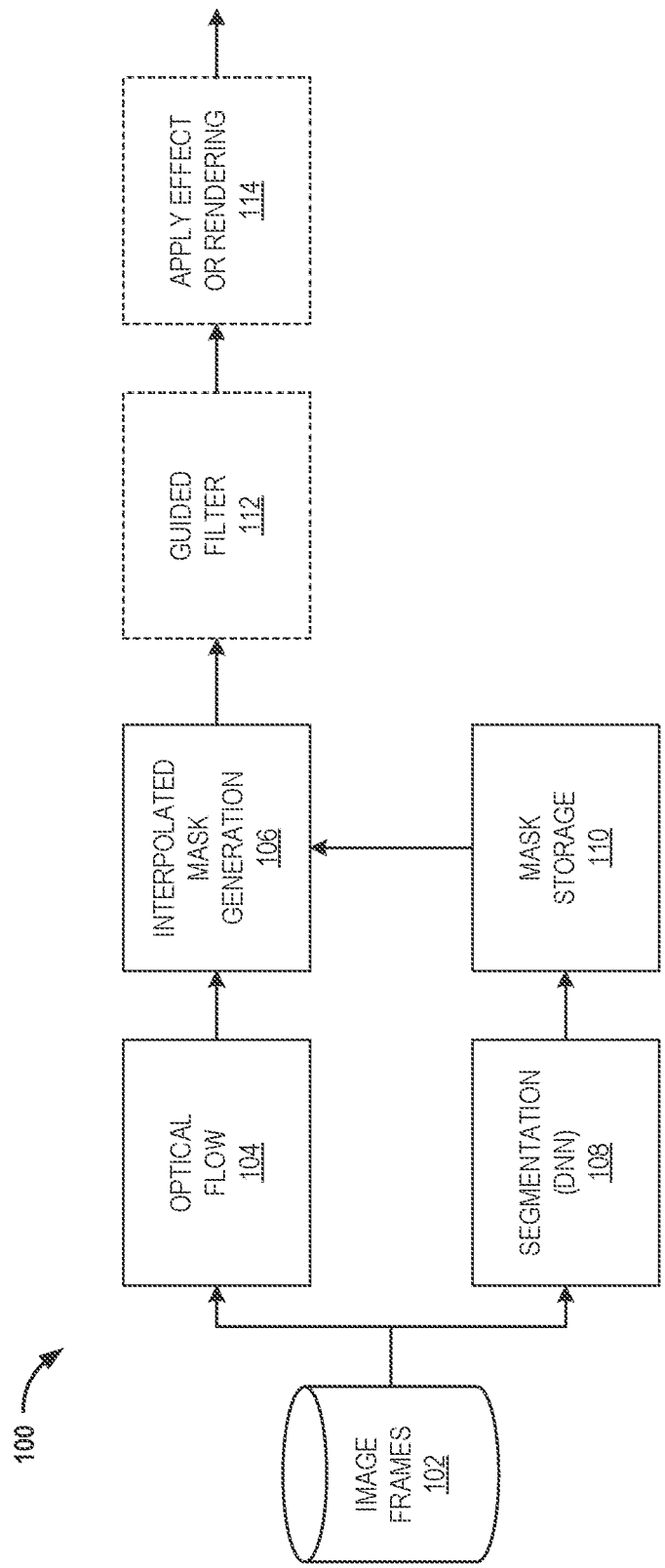
FIG. 1 is a block diagram illustrating a workflow of an image processing system, according to some example embodiments.

Systems and methods described herein use the parallel architecture of modern mobile processors and accelerate the DIS (dense inverse iearch)-based optical flow (DIS-OF) algorithm using SLAM (simultaneous localization and mapping) instruction on the mobile central processing unit (CPU) and OpenCL on the mobile graphics processing unit (GPU). By exploiting the parallelism of the algorithms, example embodiments optimize the DIS-OF algorithm to improve the processing speed. By further utilizing modern mobile processors' heterogeneous architecture, example embodiments partition the workload and distribute them onto both CPU and GPU. The optimization, in example embodiments, enables real-time optical flow computation on mobile devices and can be applied to a wide range of mobile use cases such as mobile augmented reality, video segmentation, object tracking, and so forth.

Optical flow has many applications in computer vision from face tracking to SLAM (Simultaneous localization and mapping). Asynchronous segmentation is one of such applications for optical flow. A segmentation system uses a DNN (deep neural network) to produce a segmented mask. Because of computational complexity, DNN runtime performance is very low on mid-end and low-end mobile devices. Because of low performance, it is difficult to achieve real-time segmentation on a video stream. An asynchronous segmentation system resolves this issue by running DNN segmentation in a background thread and using optical flow to produce an interpolated segmentation mask.

In one example, a mobile device comprises at least one camera for capturing images (e.g., photographs) and video via the mobile device. The mobile device may further comprise a camera-based application to provide functionality to apply creative tools (e.g., special effects, media overlays, etc.) to an image or video. For example, the creative tools may provide the ability to add special effects, media overlays, and the like, to the entire image or video or to particular objects (e.g., face, car, tree, sky, body, cat, etc.) in an image or video stream.

In one example, the camera-based application may use segmentation to identify objects (e.g., to which to apply creative tools). One problem with segmentation is that it takes a lot of time. Thus, in a camera-based application, particularly on a computing device such a mobile device, it is difficult to maintain a high frame rate per second if using a segmentation algorithm. Accordingly, some example embodiments apply segmentation on key frames and apply optical flow in between the key frames to track the previously generated mask so that the computation required by segmentation can be reduced. For example, key frames may be determined by a frame processing scheduler or by the availability of the segmentation engine (whenever the segmentation engine has finished the processing of the last key frame, example embodiments start the processing of a new frame) and then optical flow would be applied for frames in between the determined key frames. One reason for using an optical flow algorithm is that it is relatively less computationally intensive compared to segmentation. In this way, optical flow is used to track the motion of an object in a video by comparing the object with its previous object (e.g., from one frame to the next) and determining which direction the object is moving, how much it moves, and the like. By replacing segmentation for each frame, using optical flow, the computation is reduced and real-time (or near real-time) processing can be achieved on most mobile devices (e.g., including low-end or mid-end mobile phones). This system of using optical flow and segmentation is shown in the example system 100 of FIG. 1.

While optical flow is simpler and less computationally intensive than segmentation, optical flow still takes a relatively long time. For example, on mid and low-end mobile devices it can take about 15-20 milliseconds. Thus, in order to achieve a frame rate of 30 frames per second, for example, each frame should not take less than 33 milliseconds to finish any other processing. If optical flow takes 20 milliseconds, there is not much room for other processing such as post processing or rendering. Accordingly, while optical flow improves the computational overhead, there is still a problem with how much time it all takes. Example embodiments further provide for improving the speed of optical flow by using a combination of the CPU and GPU of the computing device to accelerate the algorithm. As further described herein, this speeds up the overall processing of an image/video.

FIG. 1 is a block diagram illustrating a workflow of a system 100 using segmentation and optical flow, according to some example embodiments. The system 100 includes a datastore 102 comprising one or more image frames (e.g., of a video stream). For example, these image frames may be part of a video stream being captured by a camera in a computing device such as a mobile phone. In one example, the image frames may be stored in the datastore 102 as the video is being captured. The system 100 further comprises segmentation (DNN) 108, as described above, applied to key frames of the image frames 102. The segmentation 108 may output one or more masks associated with one or more objects (e.g., a mask identifying each object) to a mask storage 110.

The system 100 comprises optical flow 104, as described above, for interpolation between the key frames. The interpolated mask generation by the optical flow 104 and the mask generated by segmentation 108 and stored in mask storage 110 is input into interpolated mask generation 106. Optional post processing may then be applied to the image frames 102, such as a guided filter 112 (e.g., to enhance or improve the mask quality) and effects or rendering 114 (e.g., applying special effects or other creatives tools to one or more objects in the video), in one example. The final frame may then be output to a display of the computing device. Example embodiments optimize the optical flow 104 of the system 100.

Figure 2:
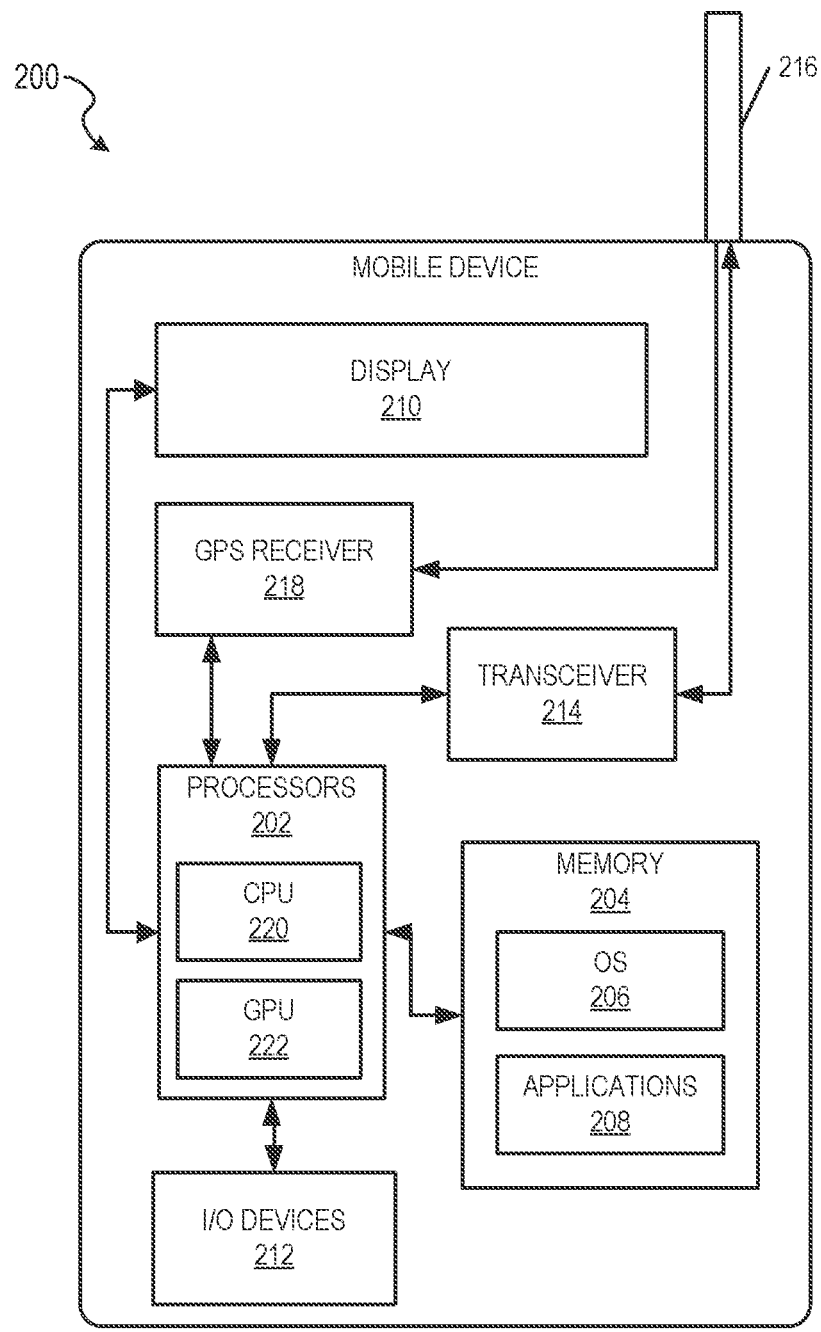
FIG. 2 illustrates an example mobile device, according to some example embodiments.

Aspects of the system 100 may be implemented using a computing device such as the example mobile device 200 shown in FIG. 2. A mobile device is a portable computing device, such as a smartphone, tablet computer, personal digital assistant (PDA), or the like. The mobile device 200 may include one or more processors 202. The one or more processors 202 may be any of a variety of different types of commercially available processors 202 suitable for mobile devices (for example, an XScale architecture microprocessor, a microprocessor without interlocked pipeline stages (MIPS) architecture processor, or another type of processor). In example embodiments, the mobile device 200 may include a CPU 220 and a GPU 222. Example embodiments may be implemented using the CPU 220 of mobile device 200, the GPU 222 of the mobile device 200, or a combination of the CPU 220 and GPU 222, as explained in further detail below.

A memory 204, such as a random access memory (RAM), a flash memory, or another type of memory, is typically accessible to the one or more processors 202. The memory 204 may be adapted to store an operating system (OS) 206, as well as applications 208, such as a camera-based application or an image processing application that may provide image effects on an image (e.g., photograph) or video. The mobile device 200 may further comprise one or more camera devices (not shown) and/or may be coupled with one or more camera devices.

The one or more processors 202 may be coupled, either directly or via appropriate intermediary hardware, to a display 210 and to one or more input/output (I/O) devices 212, such as a keypad, a touch panel sensor, a microphone, and the like. Similarly, in some embodiments, the one or more processors 202 may be coupled to a transceiver 214 that interfaces with an antenna 216. The transceiver 214 may be configured to both transmit and receive cellular network signals, wireless data signals, or other types of signals via the antenna 216, depending on the nature of the mobile device 200. Further, in some configurations, a GPS receiver 218 may also make use of the antenna 216 to receive GPS signals.

Optical flow assumes the brightness of a moving object remains constant between two frames. An optical flow equation has two unknowns (e.g., optical flows in X and Y direction) and so it does not have a unique solution from one equation. Patch based optical flow assumes the same optical flow for all the pixels within a patch and so, it derives multiple optical flow equations to find two unknowns. In one example, an image (e.g., a frame of a video) may be dividing into a plurality of patches, each patch comprising a predetermined number of pixels. The optical flow calculation will be done for each patch to determine the direction of motion and how much it moves. For example, if a patch size is 8×8 pixels, an image may be divided into 8×8 size patches.

Optical flow calculation is carried out on all levels of an image pyramid. For example, an image pyramid may be generated for an image comprising multiple layers of the image data subsampled at various resolutions for each level. The optical flow calculation is started at the uppermost level (coarsest level—with smallest image resolution) of the image pyramid. At the coarsest level, the optical flow calculation is started with some initial optical flow. The initial optical flow could be zero motion vector or motion vector from the previous frame's optical flow.

Figure 3:
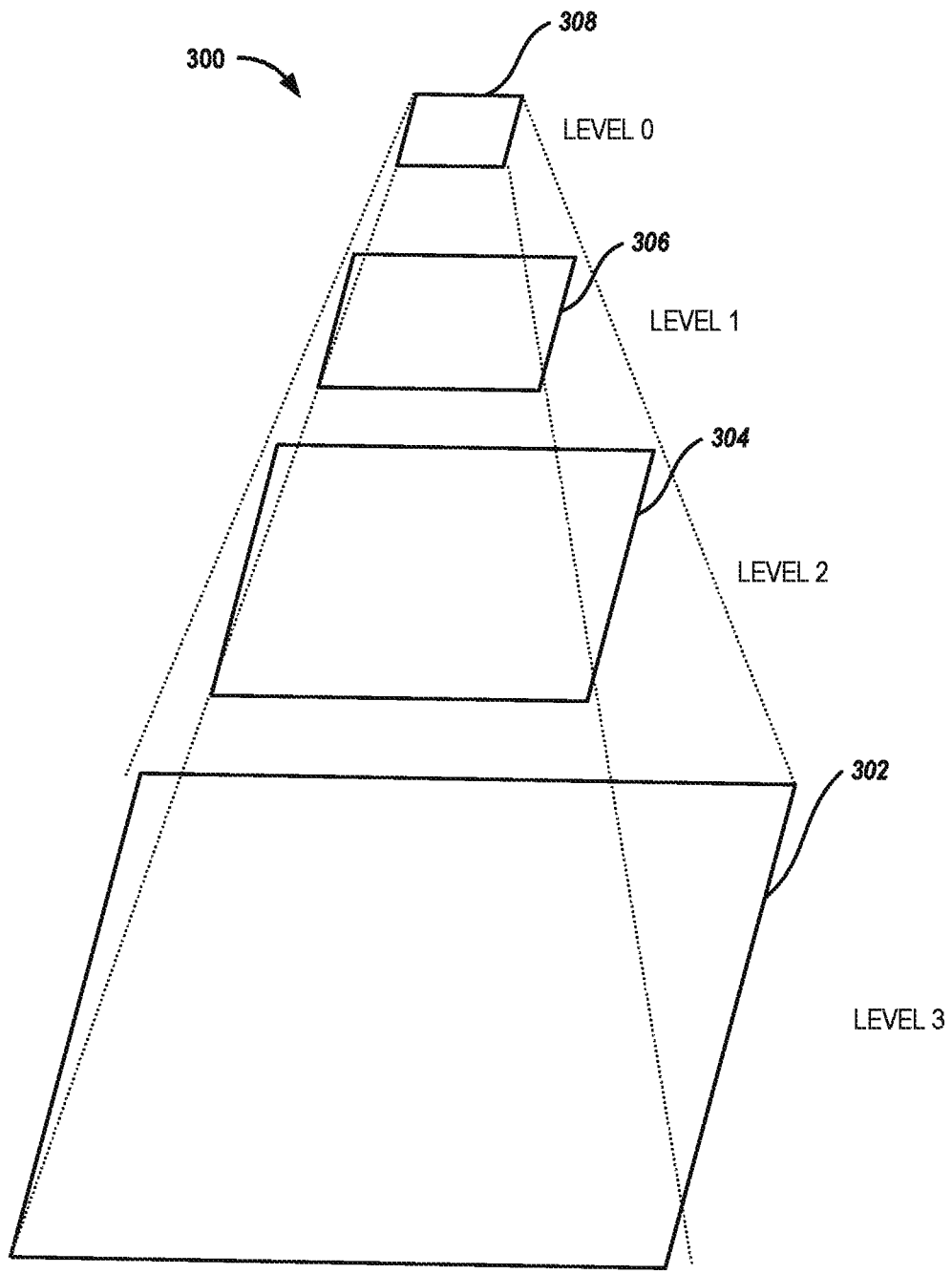
FIG. 3 illustrates an image pyramid, according to some example embodiments.

An example image pyramid 300 is shown in FIG. 3. The image pyramid 300 in FIG. 3 is shown comprising four levels. For example, a first level 302 may be the original image with the largest image resolution, a second layer 304 comprises a smaller image resolution, a third layer 306 comprises a yet smaller image resolution, and a fourth level 308 comprises the smallest or coarsest image resolution. Thus, each level may be a coarser version of previous level of the image. While the image pyramid 300 in FIG. 3 is shown comprising four levels, it is understood that an image pyramid may have any number of levels.

Once optical flow at the coarsest level is known, that optical flow is upsampled at the next level, which is used for finding optical flow at the next level. This process is iterated until the last level of optical flow is reached.

Figure 4:
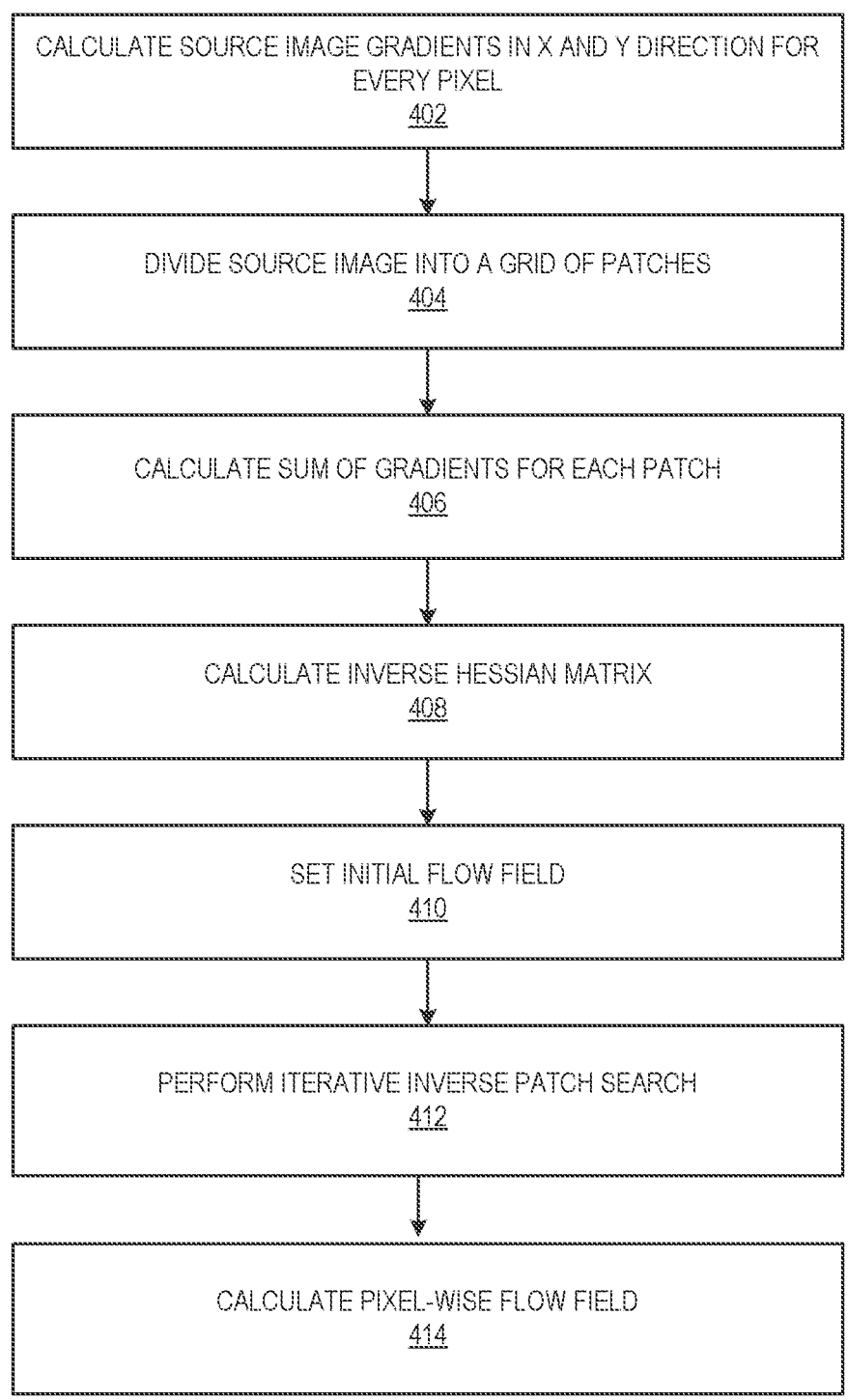
FIG. 4 is a flow chart illustrating aspects of a method, according to some example embodiments.

FIG. 4 is a flow chart illustrating aspects of a method 400 for an optical flow algorithm at each level of the image pyramid, according to some example embodiments. In operation 402, a computing device (e.g., computing device 200 of FIG. 2) calculates source image gradients ($I_x$, $I_y$) in X and Y direction for every pixel, where I is the image. In operation 404, the computing device divides the source image (e.g., the image frame of a video) into a grid of patches based on a predetermined patch-size and patch-stride. For example, a predetermined patch-size may be 8 pixels and predetermined patch-stride (e.g., starting point between two patches) may be 4 pixels. In this example, the image will be divided into 8×8 patches and a patch will start at every 4 pixels in X and Y (e.g., the patches will overlap).

In operation 406, the computing device calculates the sum of gradients for every patch. For example, the computing device calculates the following sum of gradients for every patch:
  a. $\Sigma Ix^2$: Sum of $I_x^2$ over the patch pixels
  b. $\Sigma Iy^2$: Sum of $I_y^2$ over the patch pixels
  c. $\Sigma Ixy$: Sum of a product of $I_x$ and $I_y$ over the patch pixels
  d. $\Sigma Ix$: Sum of $I_x$ over the patch pixels
  e. $\Sigma Iy$: Sum of $I_y$ over the patch pixels In operation 408, the computing device calculates inverse of the Hessian matrix (H): $H=[\Sigma Ix^2 \; \Sigma Ixy; \; \Sigma Ixy \Sigma Iy^2]$.

In operation 410, the computing device sets the initial flow field. For example, depending upon the cost of zero motion and cost using the previous frame's optical flow, the computing device sets the initial flow field for the coarsest level of the image pyramid (e.g., level 0 (308) of the image pyramid 300 in FIG. 3). For other levels of the image pyramid, the initial flow is set by the previous level.

In operation 412, the computing device performs iterative inversion patch search. For example, the computing device performs iterative inverse patch search based on inverse composition for every patch to find the incremental optical flow in X and Y (e.g. the incremental motion vector). This method comprises:
  a. Determining pixel difference between two different frames (e.g. previous (source) and current (destination) frames) for any patch. Pixel difference=Destination Image pixel−Source image pixel. Destination image pixel is calculated using bilinear interpolation at X and Y.
     i. Destination image pixels are sampled using X and Y
  b. Using the pixel difference to calculate the difference in X and Y motion vectors. $[\Delta x; \Delta y]=H^{-1}*\Sigma([Ix; Iy]*$ (Pixel difference))
  c. Updating X and Y. $[X, Y]:=[X, Y]-[\Delta x, \Delta y]$.
  d. If pixel cost (e.g., ZSSD) is less than a predetermined threshold, then the iterative process stops. Otherwise, continue by returning to step a.

After operation 412, the computing device will know the direction a patch is moving (patch flow) from the previous frame to the current frame. The patch flow may be in the form of a motion vector. In operation 414, the computing device performs densification to calculate the pixel-wise flow field using the patch flow (e.g., to find the flow for every pixel). To do this, the computing device uses the following equation to find the dense flow at every pixel, where $\lambda_{i,x}$ is 1 if the corresponding patch overlaps the pixel and $d_i(x)$ is the pixel difference between the pixel in the destination image at $(x+u_i)$ and the source image at $(x)$.

$$U_s(x) = \frac{1}{Z} \sum_{i}^{N_s} \frac{\lambda_{i,x}}{\max(1, \|d_i(x)\|_2)} \cdot u_i$$

$$Z = \sum_{i}^{N_s} \frac{\lambda_{i,x}}{\max(1, \|d_i(x)\|_2)}$$

The output of operation 412 is a motion vector with X, Y for each pixel.

Figure 5:
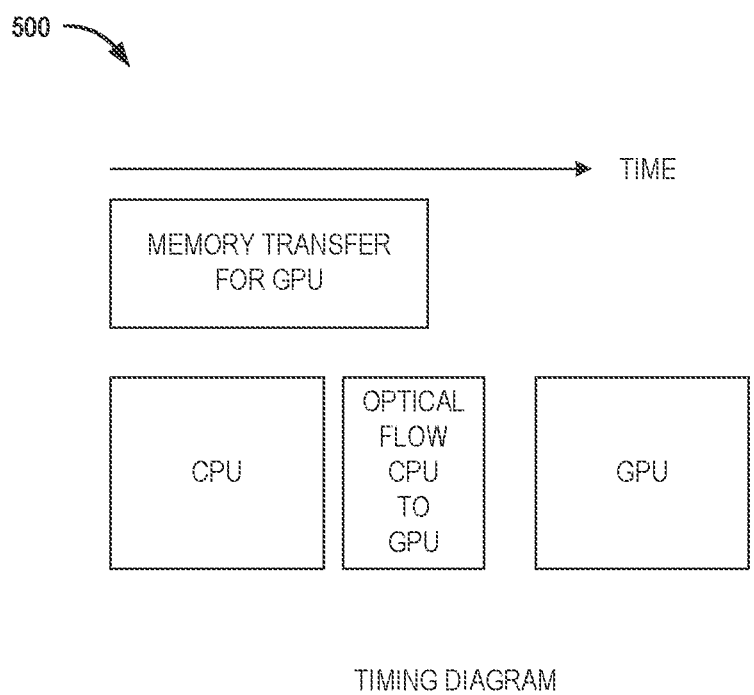
FIG. 5 illustrates a timing diagram for a separation of tasks between a CPU and GPU, according to some example embodiments.
Figure 6:
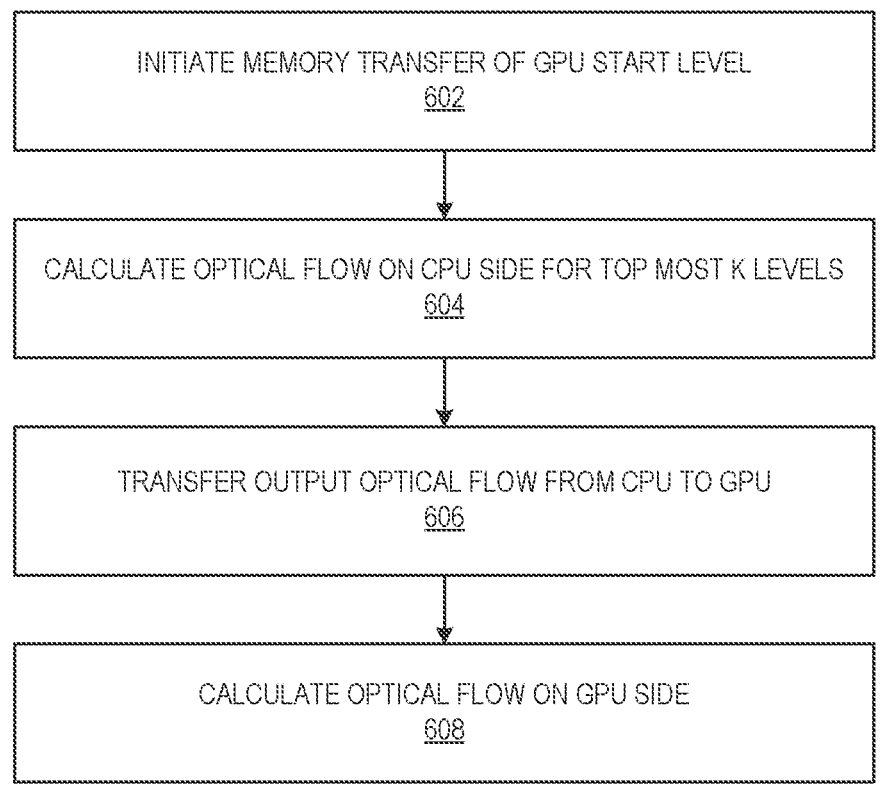
FIG. 6 is a flow chart illustrating aspects of a method, according to some example embodiments.
Figure 7:
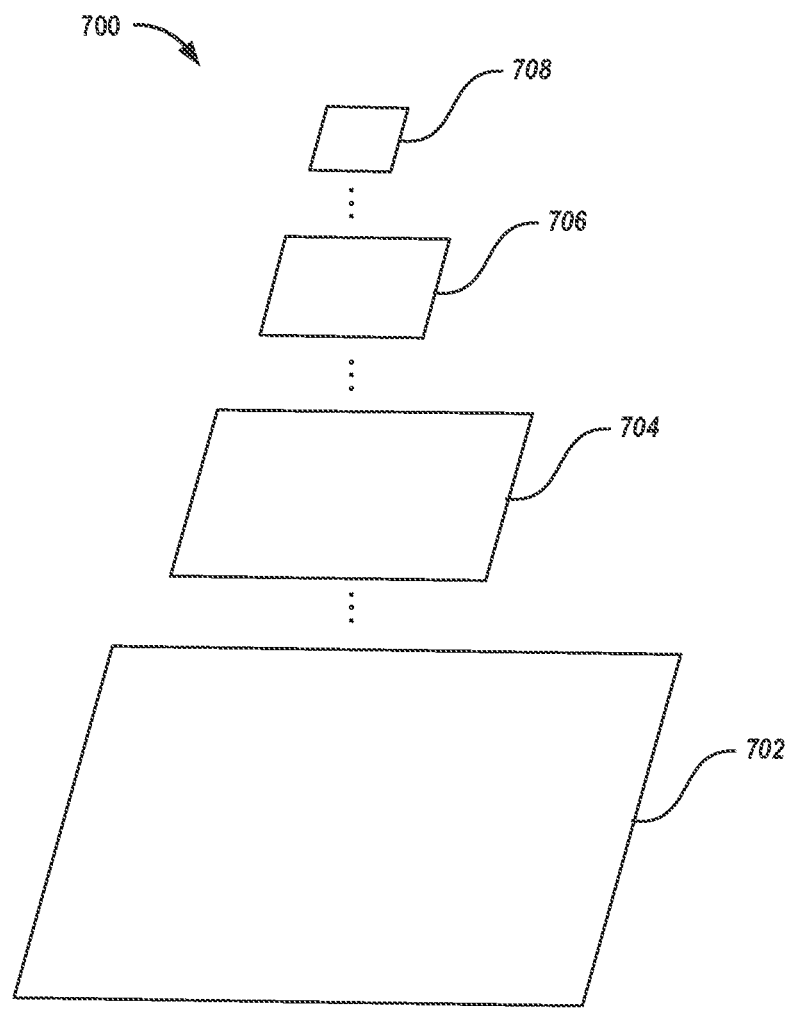
FIG. 7 illustrates example separation of tasks between a CPU and a GPU in an image pyramid, according to some example embodiments.

FIGS. 5-7 illustrate methods for efficient implementations of optical flow utilizing both the CPU and GPU of a computing device. The first efficient implementation comprises a neon SIMD (single instruction multiple data) optimization. As explained above, optical flow is a very computation intensive algorithm. Patch wise optical flow performs a lot of similar computations on a row of pixels and thus, it is an ideal candidate for SIMD. During the patch inverse search process of optical flow (e.g., operation 412 in FIG. 4), the cost of patch matching needs to be calculated for every step of the iteration. This cost function can be SSD (sum of squared difference), ZSSD (zero mean SSD), NCC (normalized cross-correlation), or other cost function. Calculating cost can be efficiently implemented on SIMD. In one example embodiment, ZSSD (e.g., step d of operation 412) is implemented on SIMD. For example, for every row of pixels, a chunk of 4 pixels are processed in one group of SIMD instructions. This way, computation of 4 pixels of a patch can happen in parallel and thus step d of operation 412 is optimized.

During the dense optical flow calculation (e.g., operation 414 of FIG. 4) from patch wise optical flow, the pixel difference cost of using neighbor optical flow output needs to be evaluated. This calculation requires bilinear interpolation using the fractional part of motion vectors to generate interpolated pixels in the next frame. This process is efficiently implemented in SIMD by generating four bilinear interpolated pixels at a time. Accordingly, operation 414 is optimized.

The second efficient implementation comprises a GPU implementation. First, for any algorithm to run on a GPU, it should have sufficient parallel workload to efficiently exploit GPU hardware resources. Patch based optical flow (e.g. operation 412 of FIG. 4) has serial dependency among patches and because of that serial dependency, patch inverse search for every patch needs to be calculated one after another in raster scan order. Example embodiments break this serial dependency while maintaining similar quality (e.g., average endpoint error) of optical flow. For GPU implementation, patch inverse search for every patch is performed independently and then there is a synchronization phase, which checks the output of optical flow of neighbor patch. After synchronization, a patch's optical flow result might be updated with the neighbor optical flow if a neighbor optical flow produces better quality (ZSSD) optical flow. After synchronization, patch inverse search is again performed to converge further. This way, iterative convergence and synchronization phase is iterated a couple of times to achieve better quality optical flow.

Figure 8:
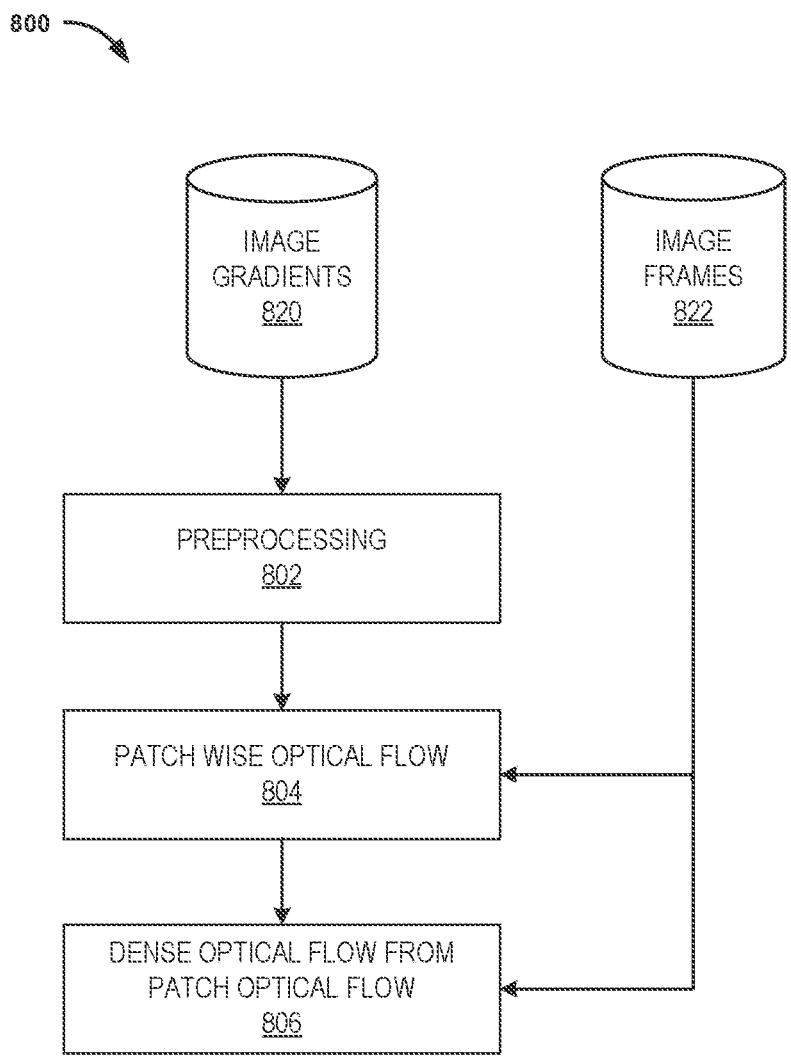
FIG. 8 illustrates a workflow of optical flow calculations on a CPU, according to some example embodiments.
Figure 9:
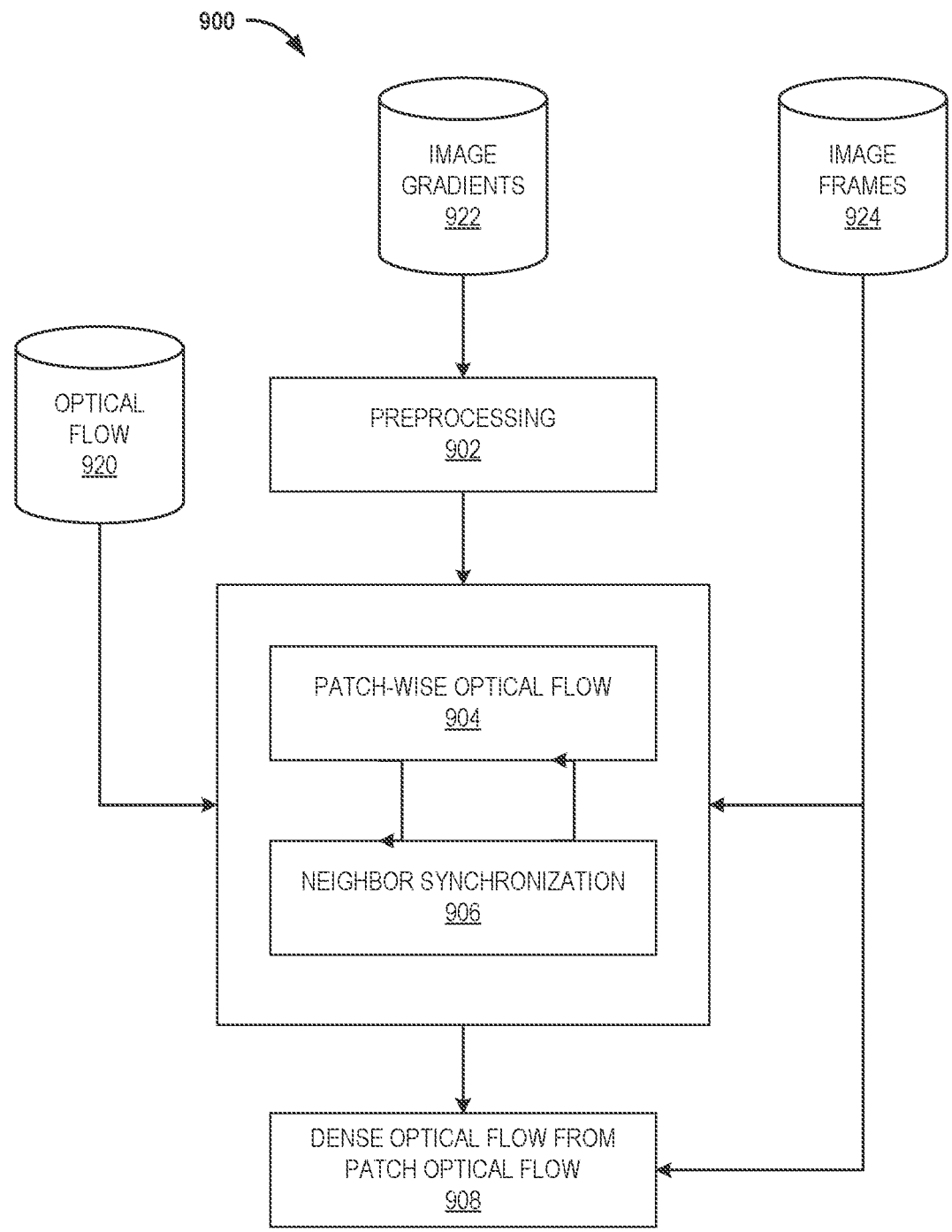
FIG. 9 illustrates a workflow of optical flow calculations on a GPU, according to some example embodiments.

Second, another issue faced during efficient parallel implementation of optical flow is that the coarsest level of the pyramid has a small image resolution and so it does not have a sufficient amount of workload to process on a GPU. Calculating optical flow for small image resolution on the GPU side will have an overhead of scheduling tasks and so it performs poorly in terms of computation efficiency. Example embodiments process the coarse levels on the CPU side (as shown in FIG. 8) and the large image levels on GPU side (as shown in FIG. 9).

In one example, the computing device may determine which levels (e.g., coarse levels) will be processed on the CPU side and which will be processed on the GPU side based on the computing device capabilities. This may vary from computing device to computing device. For example, the computing device may perform a tuning step to select a level of image pyramid from where the GPU will take over. This tuning step may be a one-time cost (e.g., when an object is constructed). In another example, the level(s) to be processed on a CPU may be predetermined based on certain parameters (e.g., computing device capabilities) or based on a default predetermined level(s) to be processed on the CPU.

Also, while processing of the coarse levels is carried out, memory transfer for the GPU can be done in parallel. This will hide memory transfer cost and achieves CPU-GPU sharing. This is shown in the timing diagram 500 of FIG. 5 where memory transfer for the start level of the GPU is happening in parallel to optical flow calculation on the coarse levels.

Third, after finishing optical flow calculation of any level of the image pyramid, upsampling of the optical flow matrix is required to produce initial optical flow for the next level larger resolution, which provides a starting point of convergence for the next level. This upsampling operation will require reading small resolution optical flow matrix, performing bilinear interpolation, and then storing (write) into a larger resolution matrix. This whole operation can be avoided by exploiting a GPU's memory read operation, which supports bilinear interpolation on the fly without any performance penalty. So, example embodiments read the previous pyramid level optical flow by downsampling the location (x, y) and reading optical flow result from the previous level with on the fly bilinear interpolation.

FIG. 6 is a flow chart illustrating aspects of a method 600 for processing image data using an optical flow algorithm utilizing both the CPU and GPU, according to some example embodiments. As explained above, a computing device, such as a mobile device 200 of FIG. 2 may comprise (or be coupled with) one or more cameras to allow capture of images (e.g., photographs) and/or video. In one example, the computing device receives image data from the camera comprising an image or video that is being captured by the camera. The computing device may store the image data in one or more data stores (e.g., data store 102). The computing device performs image processing on the image data, such as the image processing shown in FIG. 1, including the optical flow process shown in FIG. 4. As explained above, example embodiments provide for optimization of the optical flow process by using both the CPU and GPU of the computing device.

In one example, the image data may comprise one or more frames of a video stream for a video being captured by the camera of the computing device. After receiving the image data from one or more cameras, the computing device generates an image pyramid comprising multiple levels of an image (e.g., a frame of a video) in the image data, subsampled at various resolutions for each level. One example image pyramid 300 is shown in FIG. 3 and described above. Another example image pyramid 700 is shown in FIG. 7.

The image pyramid of FIG. 7 shows four levels. A first level 702 may comprise the original image (e.g., frame of a video) at the highest resolution, a second level 704 may be the image with a smaller resolution, a third level 706 may be the image with a yet smaller image resolution, and a fourth level 708 may be the image with the smallest or coarsest image resolution. Thus, each level may be a coarser version of previous level of the image. While the image pyramid 700 in FIG. 7 is shown comprising four levels, it is to be understood that an image pyramid may have any number of layers. In one example, one or more coarser levels may be designated for processing by the CPU and one or more of higher resolution levels may be designated for processing by the GPU, as explained earlier. In this example, the first level 702 and the second level 704 may comprise the higher resolution and thus, be designated for processing by the GPU and the third level 706 and fourth level 708 may comprise coarser resolution and thus be designated for processing by the CPU. In other examples, different levels may be designated for processing by the CPU and GPU.

Returning to FIG. 6, in operation 602, the computing device (e.g., computing device 200 of FIG. 2) initiates memory transfer of a GPU start level. For example, if a first level and a second level of an image pyramid comprising higher resolution are designated for processing by the GPU (e.g., first level 702 and second level 704 of FIG. 7) then the image data for these two levels are transferred to the GPU. Thus, image data corresponding to at least one predetermined level of the image pyramid comprising higher resolution is transferred to the GPU of the computing device.

During initialization and transfer of the image data to the GPU, the CPU of the computing device calculates the optical flow of at least one predetermined coarse level of the image pyramid, as shown in operation 604. FIG. 5 shows how the CPU processing is done during the memory transfer for the GPU. The CPU may calculate the optical flow of the at least one predetermined coarse level of the image pyramid using the process shown in FIG. 4 and described above.

FIG. 8 illustrates the optical flow calculation at the CPU (e.g., the neon (SIMD) optimization for coarse level calculations, as explained above). As explained in further detail in respect to FIG. 4 above, the computing device preprocesses the image gradients 820 in operation 802 (e.g., sum of gradients in operation 406 and inverse Hessian calculation in operation 408 of FIG. 4), performs patch-wise optical flow in operation 804 (e.g., operation 412 of FIG. 4), and then performs dense optical flow from the patch-wise optical flow in operation 806 (e.g., operation 414 of FIG. 4). In one example, the optical flow calculations for the coarse levels are done in serial by the CPU.

Returning to FIG. 6, after the CPU calculates the optical flow of the at least one predetermined coarse level of the image pyramid, the CPU of the computing device transfers the output (e.g., the calculated optical flow of the at least one predetermined coarse level of the image pyramid) to the GPU, as shown in operation 606. For example, the CPU of the computing device transfers the optical flow for the level before the level that the GPU will start with. This process is also shown in the timing diagram 500 of FIG. 5.

In operation 608, the GPU of the computing device calculates the optical flow of the at least one predetermined level of the image pyramid comprising higher resolution (e.g., levels 706 and 708 of FIG. 7) using the optical flow calculated by the CPU. For example, once the last level of the CPU result is transferred to the GPU, the initial flow field is set for the first level of GPU. The GPU will upsample this initial flow field using on the fly bilinear interpolation and start the optical flow calculation at that level.

FIG. 9 illustrates the optical flow calculation at the GPU. The process in FIG. 9 is similar to the process in FIG. 8 for the CPU (e.g., preprocessing image gradients 922 in operation 902, performing patch-wise optical flow in operation 904, performing dense optical from patch optical flow in operation 908), except that the GPU is receiving the optical flow of the coarser levels from the CPU and since the GPU performs the patch-wise optical flow in parallel, it also includes a synchronization phase (e.g., neighbor synchronization 906). The neighbor synchronization 906 comprises, for a given patch of a plurality of patches in a layer of the image pyramid, determining all neighbor patches for a given patch. A neighbor patch is a patch that is near or next to the given patch. For example, a patch above, a patch to the right, a patch to the left, and a patch below the given patch. Depending on the location of the given patch, the given patch may not have a patch to the right and to the left and below and above, but instead may only have a subset of these neighbor patches.

The computing device next determines each neighbor patch motion vector value. A motion vector value may comprise of (X, Y) value, such as (4.5, −5.5). The computing device compares each neighbor patch motion vector value to a motion vector value of the given patch. If any neighbor patch motion vector has lower cost (e.g., the value given by a cost function, such as for example, ZSSD) than the cost of using the motion vector of given patch, the given patch's motion vector is updated with that neighbor's patch motion vector. The lower the cost is, the higher the probability that the two patches from two frames are the same patch. In one example, the given patch is updated with the neighbor patch motion vector value with the lowest cost.

The GPU may output the optical flow of the image data. The output from the GPU is the optical flow for the image (e.g., frame of the video stream). The optical flow indicates how every pixel is moving in the X direction, and by how much, and in the Y direction, and by how much. This is then used for further processing of the image (e.g., to determine where to place a creative tool based on where the object to which to apply the creative tool has moved/will move to in the next frame). In this way the computing device can generate a new mask by warping the old mask using the optical flow motion vector values.

Example embodiments described herein have been tested by the inventors for performance. The following table shows performance comparison between a CPU only implementation and example embodiments. Performance data was generated on Samsung Galaxy S7 device. For performance measurement, optical flow is run between two image frames around 100 times and average performance is reported, here. As shown in the result, it achieves approximately 4× speed up.

| Version | Execution time (ms) for 180 × 320 image |
| --- | --- |
| CPU only | 97 ms |
| CPU only (with SIMD) | 75 ms |
| CPU + GPU | 18 ms |

Example embodiments may be used in a variety of use cases. For example, example embodiments may be used in a camera application to apply creative tools, such as special effects and media overlays, to a photograph or video. In another example, example embodiments may be used in a messaging system or application to apply creative tools to a photograph or video to be shared via the messaging system with one or more users. For example, the photograph or video with the creative tools may be sent as a message to one or more users, added to a media collection, and the like.

Figure 10:
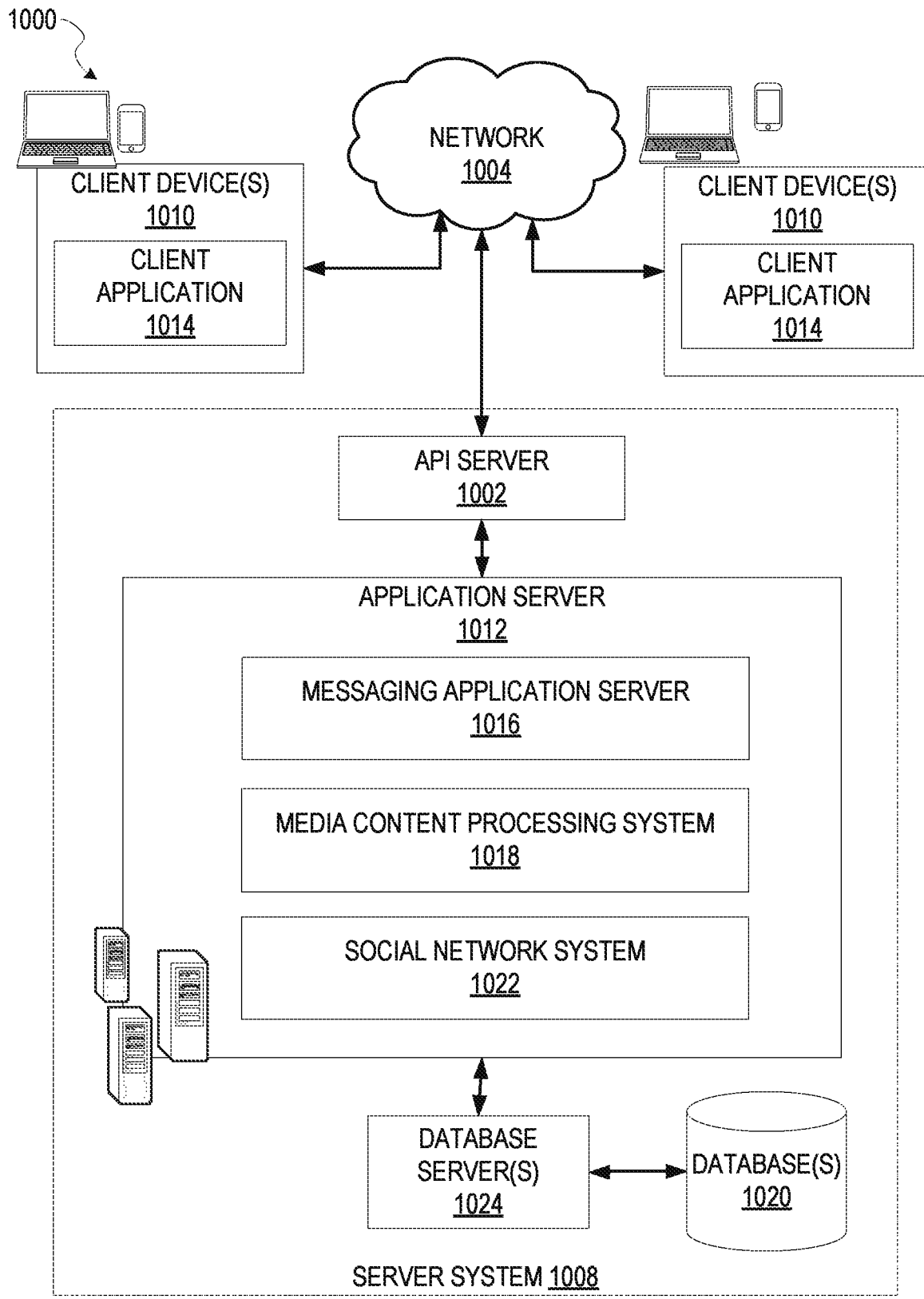
FIG. 10 is a block diagram showing an example messaging system for exchanging data (e.g., messages and associated content) over a network, according to some example embodiments.

FIG. 10 is a block diagram illustrating a networked system 1000 (e.g., a messaging system) for exchanging data (e.g., messages and associated content) over a network. The networked system 1000 includes multiple client devices 1010, each of which hosts a number of client applications 1014. Each client application 1014 is communicatively coupled to other instances of the client application 1014 and a server system 1008 via a network 1004.

The client device 1010 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 1000. In some embodiments, the client device 1010 may comprise a display module (not shown) to display information (e.g., in the form of user interfaces). In further embodiments, the client device 1010 may comprise one or more of touch screens, accelerometers, gyroscopes, cameras, microphones, global positioning system (GPS) devices, and so forth. In some embodiments, the client device 1010 is mobile device 200 of FIG. 2.

The client device 1010 may be a device of a user that is used to create media content items such as video, images (e.g., photographs), and audio, and to send and receive messages containing such media content items, text, and so forth, to and from other users. The client device 1010 may be a device of a user that is used to create and edit media overlays and access a plurality of media collections. The client device 1010 may be a device of a user that is used to apply a bokeh effect to a photograph or video, as described above.

One or more users may be a person, a machine, or other means of interacting with the client device 1010. In example embodiments, the user may not be part of the system 1000, but may interact with the system 1000 via the client device 1010 or other means. For instance, the user may provide input (e.g., touch screen input or alphanumeric input) to the client device 1010, and the input may be communicated to other entities in the system 1000 (e.g., third party servers, server system 1008, etc.) via a network 1004. In this instance, the other entities in the system 1000, in response to receiving the input from the user, may communicate information to the client device 1010 via the network 1004 to be presented to the user. In this way, the user may interact with the various entities in the system 1000 using the client device 1010.

The system 1000 may further include a network 1004. One or more portions of the network 1004 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 1010 may access the various data and applications provided by other entities in the system 1000 via a web client (e.g., a browser, such as the Internet Explorer® browser developed by Microsoft® Corporation of Redmond, Wash. State) or one or more client applications 1014. The client device 1010 may include one or more client applications 1014 (also referred to as "apps") such as, but not limited to, a web browser, a messaging application, an electronic mail (email) application, an e-commerce site application, a mapping or location application, a media overlay application, an interactive messaging application, an application for applying a bokeh effect to an image, and the like.

In some embodiments, one or more client applications 1014 may be included in a given one of the client devices 1010, and configured to locally provide the user interface and at least some of the functionalities, with the client application 1014 configured to communicate with other entities in the system 1000 (e.g., third-party servers, server system 1008, etc.), on an as-needed basis, for data and/or processing capabilities not locally available (e.g., to process user queries, to authenticate a user, to verify a method of payment, etc.). Conversely, one or more client applications 1014 may not be included in the client device 1010, and then the client device 1010 may use its web browser to access the one or more applications hosted on other entities in the system 1000 (e.g., third-party servers, server system 1008, etc.).

In one example, a client application 1014 may be a messaging application that allows a user to take a photograph or video, add a caption or otherwise edit the photograph or video (e.g., apply a bokeh effect in some embodiments), and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 1014. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 1008 may provide server-side functionality via the network 1004 (e.g., the Internet or a wide area network (WAN)) to one or more client devices 1010 and/or one or more third party servers (not shown). The server system 1008 may include an application programming interface (API) server 1002, an application server 1012, a messaging application server 1016, a media content processing system 1018, and a social network system 1022, which may each be communicatively coupled with each other and with one or more data storage(s), such as database (s) 1020.

The server system 1008 may be a cloud-computing environment, according to some example embodiments. The server system 1008, and any servers associated with the server system 1008, may be associated with a cloud-based application, in one example embodiment.

The one or more database(s) 1020 may be storage devices that store information such as untreated media content, original media content from users (e.g., high-quality media content), processed media content (e.g., media content that is formatted for sharing with client devices 1010 and viewing on client devices 1010), context data related to a media content item, context data related to a user device (e.g., computing or client device 1010), media overlays, media overlay smart widgets or smart elements, user data, user device information, media content (e.g., video and images), media content data (e.g., data associated with video and images), computing device context data, serialized data, session data items, and so forth. The one or more databases 1020 may further store information related to third-party servers, third-party applications, client devices 1010, client applications 1014, users, and so forth.

The one or more database(s) 1020 may include cloud-based storage external to the server system 1008 (e.g., hosted by one or more third-party entities external to the server system 1008). While the storage devices are shown as database(s) 1020, it is to be understood that the system 1000 may access and store data in storage devices such as databases 1020, blob storages, and other types of storage methods.

The system 1000 may further include one or more third-party servers (not shown). The one or more third-party servers may include one or more third-party application(s). The one or more third-party application(s), executing on the third-party server(s), may interact with the server system 1008 via API server 1002 via a programmatic interface provided by the API server 1002. For example, one or more of the third-party applications may request and utilize information from the server system 1008 via the API server 1002 to support one or more features or functions on a website hosted by the third party or an application hosted by the third party. The third-party website or application, for example, may provide functionality that is supported by relevant functionality and data in the server system 1008.

Accordingly, each client application 1014 can communicate and exchange data with other client applications 1014 and with the server system 1008 via the network 1004. The data exchanged between client applications 1014, and between a client application 1014 and the server system 1008, includes functions (e.g., commands to invoke functions) as well as payload data (e.g., text, audio, video, or other multimedia data).

The server system 1008 provides server-side functionality via the network 1004 to a particular client application 1014. While certain functions of the system 1000 are described herein as being performed by either a client application 1014 or by the server system 1008, it will be appreciated that the location of certain functionality either within the client application 1014 or within the server system 1008 is a design choice. For example, it may be technically preferable to initially deploy certain technology and functionality within the server system 1008, but to later migrate this technology and functionality to the client application 1014 where a client device 1010 has a sufficient processing capacity.

The server system 1008 supports various services and operations that are provided to the client application 1014. Such operations include transmitting data to, receiving data from, and processing data generated by the client application 1014. This data may include message content, client device information, geolocation information, media annotation and overlays, message content persistence conditions, social network information, live event information, date and time stamps, media content (e.g., video and images), media content data (e.g., data associated with video and images), and user data (e.g., user click data), as examples. Data exchanges within the networked system 1000 are invoked and controlled through functions available via user interfaces (UIs) of the client application 1014.

In the server system 1008, the API server 1002 is coupled to, and provides a programmatic interface to, the application server 1012. The application server 1012 is communicatively coupled to a database server 1024, which facilitates access to the one or more database(s) 1020 in which is stored data associated with messages processed by the application server 1012.

The API server 1002 receives and transmits message data (e.g., commands and message payloads) between the client device 1010 and the application server 1012. Specifically, the API server 1002 provides a set of interfaces (e.g., routines and protocols) that can be called or queried by the client application 1014 to invoke functionality of the application server 1012. The API server 1002 exposes various functions supported by the application server 1012, including account registration; login functionality; the sending of messages, via the application server 1012, from a particular client application 1014 to another client application 1014; the sending of media files (e.g., images or video) from a client application 1014 to the messaging application server 1016, for possible access by another client application 1014; the setting of a collection of media data (e.g., a gallery, story, message collection, or media collection); the retrieval of a list of friends of a user of a client device 1010; the retrieval of such collections; the retrieval of messages and content; the adding of friends to and deletion of friends from a social graph; the location of friends within a social graph; opening an application event (e.g., relating to the client application 1014); and so forth.

The application server 1012 hosts a number of applications and subsystems, including the messaging application server 1016, the media content processing system 1018, and the social network system 1022. The messaging application server 1016 implements a number of message processing technologies and functions, particularly related to the aggregation and other processing of content (e.g., textual and multimedia content) included in messages received from multiple instances of the client application 1014. The text and media content from multiple sources may be aggregated into collections of content (e.g., called stories, galleries, or media collections). These collections are then made available, by the messaging application server 1016, to the client application 1014. Other processor- and memory-intensive processing of data may also be performed server-side by the messaging application server 1016, in view of the hardware requirements for such processing.

The application server 1012 also includes the media content processing system 1018, which is dedicated to performing various media content processing operations, typically with respect to images or video received within the payload of a message at the messaging application server 1016. The media content processing system 1018 may access one or more data storages (e.g., database(s) 1020) to retrieve stored data to use in processing media content and to store results of processed media content.

The social network system 1022 supports various social networking functions and services, and makes these functions and services available to the messaging application server 1016. To this end, the social network system 1022 maintains and accesses an entity graph 1204 (depicted in FIG. 12) within the database 1020. Examples of functions and services supported by the social network system 1022 include the identification of other users of the networked system 1000 with whom a particular user has relationships or whom the particular user is "following," and also the identification of other entities and interests of a particular user.

The messaging application server 1016 may be responsible for generation and delivery of messages between users of client devices 1010. The messaging application server 1016 may utilize any one of a number of message delivery networks and platforms to deliver messages to users. For example, the messaging application server 1016 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 11:
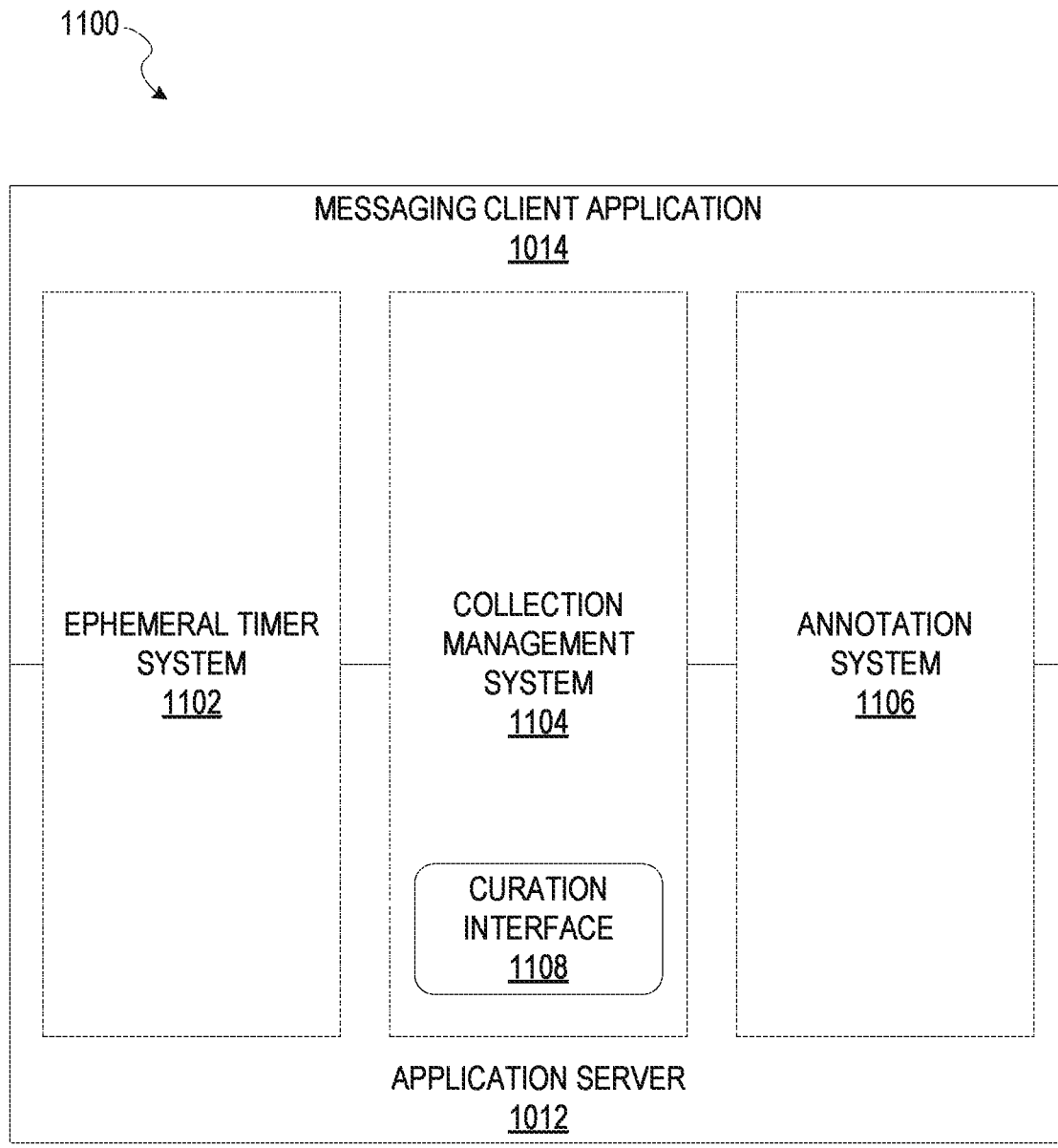
FIG. 11 is a block diagram illustrating further details regarding the messaging system, according to some example embodiments.

FIG. 11 is a block diagram 1100 illustrating further details regarding the networked system 1000, according to example embodiments. Specifically, the system 1100 is shown to comprise the messaging client application 1014 and the application server 1012 which, in turn, embody a number of subsystems, namely an ephemeral timer system 1102, a collection management system 1104, and an annotation system 1106.

The ephemeral timer system 1102 is responsible for enforcing the temporary access to content permitted by the messaging client application 1014 and the messaging application server 1016. To this end, the ephemeral timer system 1102 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 1014.

The collection management system 1104 is responsible for managing collections of media (e.g., collections of text, image, video, and audio data), otherwise referred to herein as "media collections." In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 1104 may also be responsible for publishing an icon that provides notification of the existence of a particular collection to the user interface of the messaging client application 1014.

The collection management system 1104 furthermore includes a curation interface 1108 that allows a collection manager to manage and curate a particular collection of content. For example, the curation interface 1108 enables an event organizer to curate a collection of content relating to a specific event (e.g., delete inappropriate content or redundant messages). Additionally, the collection management system 1104 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 1108 operates to automatically make payments to such users for the use of their content.

The annotation system 1106 provides various functions that enable a user to annotate or otherwise modify or edit media content associated with a message. For example, the annotation system 1106 provides functions related to the generation and publishing of media overlays for messages processed by the networked system 1000. In one example, the annotation system 1106 operatively supplies a media overlay (e.g., a filter or media augmentation) to the messaging client application 1014 based on a geolocation of the client device 1010. In another example, the annotation system 1106 operatively supplies a media overlay to the messaging client application 1014 based on other information, such as social network information of the user of the client device 1010. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 1010. For example, the media overlay includes text that can be overlaid on top of a photograph taken by the client device 1010. In another example, the media overlay includes an identification of a location overlay (e.g., Venice Beach), a name of a live event, or a name of a merchant overlay (e.g., Beach Coffee House). In another example, the annotation system 1106 uses the geolocation of the client device 1010 to identify a media overlay that includes the name of a merchant at the geolocation of the client device 1010. The media overlay may include other indicia associated with the merchant. The media overlays may be stored in the database 1020 and accessed through the database server 1024.

The annotation system 1106 may further enable a user to interact with an interactive message, such as by adding one or more media content items to the interactive message, as described in further detail below. In one example embodiment, the annotation system 1106 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 1106 provides a user-based publication platform that enables users to select a geolocation on a map, and upload content associated with the selected geolocation. The user may also specify circumstances under which a particular media overlay is to be offered to other users. The annotation system 1106 generates a media overlay that includes the uploaded content and associates the uploaded content with the selected geolocation.

In another example embodiment, the annotation system 1106 provides a merchant-based publication platform that enables merchants to select a particular media overlay associated with a geolocation via a bidding process. For example, the annotation system 1106 associates the media overlay of a highest bidding merchant with a corresponding geolocation for a predefined amount of time.

Figure 12:
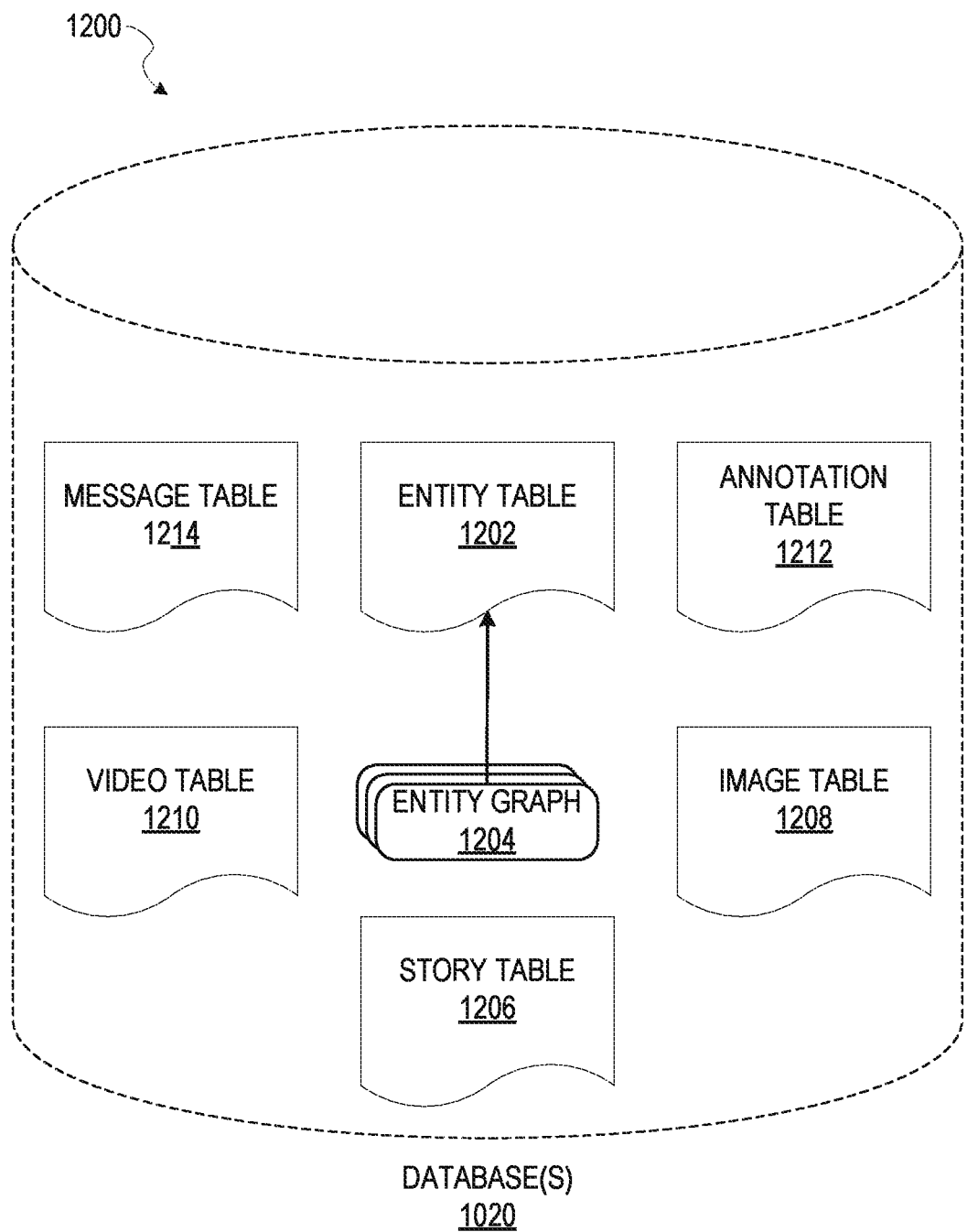
FIG. 12 is a schematic diagram illustrating data which may be stored in a database of a messaging server system, according to some example embodiments.

FIG. 12 is a schematic diagram 1200 illustrating data which may be stored in the database(s) 1020 of the server system 1008, according to certain example embodiments. While the content of the database 1020 is shown to comprise a number of tables, it will be appreciated that the data could be stored in other types of data structures (e.g., as an object-oriented database).

The database 1020 includes message data stored within a message table 1214. An entity table 1202 stores entity data, including an entity graph 1204. Entities for which records are maintained within the entity table 1202 may include individuals, corporate entities, organizations, objects, places, events, etc. Regardless of type, any entity regarding which the server system 1008 stores data may be a recognized entity. Each entity is provided with a unique identifier, as well as an entity type identifier (not shown).

The entity graph 1204 furthermore stores information regarding relationships and associations between entities. Such relationships may be social, professional (e.g., work at a common corporation or organization), interested-based, or activity-based, merely for example.

The database 1020 also stores annotation data, in the example form of media overlays or filters, in an annotation table 1212. Annotation data may also be referred to herein as "creative tools" or "interactive features." Annotation data may comprise predefined interactive messages to be provided to users.

Media overlays or filters, for which data is stored within the annotation table 1212, are associated with and applied to videos (for which data is stored in a video table 1210) and/or images (for which data is stored in an image table 1208). Filters, in one example, are overlays that are displayed as overlaid on an image or video during presentation to a recipient user. Filters may be of various types, including user-selected filters from a gallery of filters presented to a sending user by the messaging client application 1014 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 1014, based on geolocation information determined by a GPS unit of the client device 1010. Another type of filter is a data filter, which may be selectively presented to a sending user by the messaging client application 1014, based on other inputs or information gathered by the client device 1010 during the message creation process. Examples of data filters include a current temperature at a specific location, a current speed at which a sending user is traveling, a battery life for a client device 1010, or the current time.

Other annotation data that may be stored within the annotation table 1212 is so-called "lens" data. A "lens" may be a real-time special effect and sound that may be added to an image or a video.

As mentioned above, the video table 1210 stores video data which, in one embodiment, is associated with messages for which records are maintained within the message table 1214. Similarly, the image table 1208 stores image data associated with messages for which message data is stored in the message table 1214. The entity table 1202 may associate various annotations from the annotation table 1212 with various images and videos stored in the image table 1208 and the video table 1210.

A story table 1206 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 1202). A user may create a "personal story" in the form of a collection of content that has been created and sent/broadcast by that user. To this end, the user interface of the messaging client application 1014 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 1010 have location services enabled and are at a common event location at a particular time may, for example, be presented with an option, via a user interface of the messaging client application 1014, to contribute content to a particular live story. The live story may be identified to the user by the messaging client application 1014, based on his or her location. The end result is a "live story" told from a community perspective.

A further type of content collection is known as a "location story," which enables a user whose client device 1010 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 13:
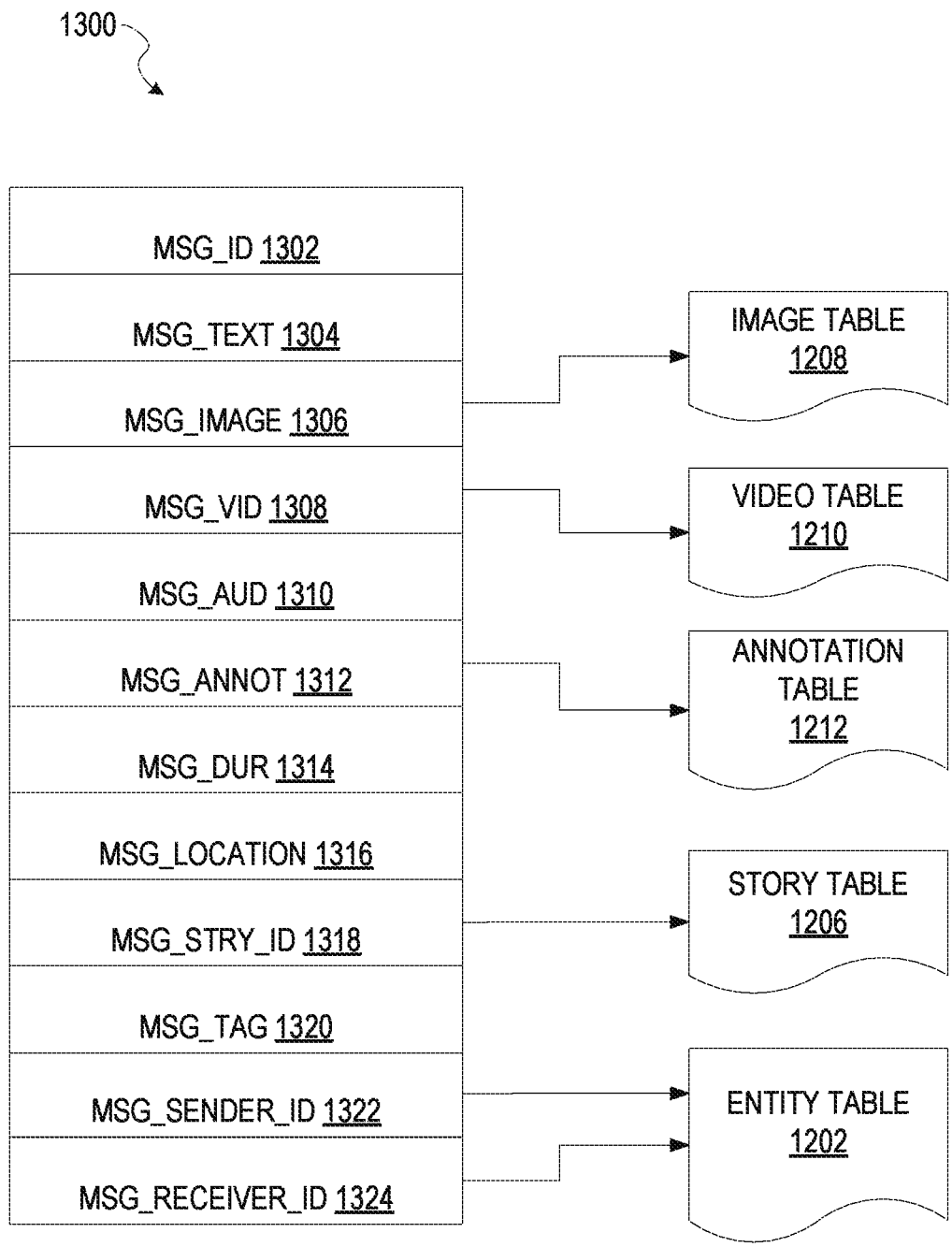
FIG. 13 is a schematic diagram illustrating a structure of a message, according to some embodiments, generated by a messaging client application for communication.

FIG. 13 is a schematic diagram illustrating a structure of a message 1300, according to some embodiments, generated by a client application 1014 for communication to a further client application 1014 or the messaging application server 1016. The content of a particular message 1300 is used to populate the message table 1214 stored within the database 1020, accessible by the messaging application server 1016. Similarly, the content of a message 1300 is stored in memory as "in-transit" or "in-flight" data of the client device 1010 or the application server 1012. The message 1300 is shown to include the following components:

A message identifier 1302: a unique identifier that identifies the message 1300.

A message text payload 1304: text, to be generated by a user via a user interface of the client device 1010 and that is included in the message 1300.

A message image payload 1306: image data, captured by a camera component of a client device 1010 or retrieved from memory of a client device 1010, and that is included in the message 1300.

A message video payload 1308: video data, captured by a camera component or retrieved from a memory component of the client device 1010 and that is included in the message 1300.

A message audio payload 1310: audio data, captured by a microphone or retrieved from the memory component of the client device 1010, and that is included in the message 1300.

A message annotations 1312: annotation data (e.g., media overlays such as filters, stickers, or other enhancements) that represents annotations to be applied to the message image payload 1306, message video payload 1308, or message audio payload 1310 of the message 1300.

A message duration parameter 1314: a parameter value indicating, in seconds, the amount of time for which content of the message 1300 (e.g., the message image payload 1306, message video payload 1308, message audio payload 1310) is to be presented or made accessible to a user via the messaging client application 1014.

A message geolocation parameter 1316: geolocation data (e.g., latitudinal and longitudinal coordinates) associated with the content payload of the message 1300. Multiple message geolocation parameter 1316 values may be included in the payload, each of these parameter values being associated with respect to content items included in the content (e.g., a specific image within the message image payload 1306, or a specific video in the message video payload 1308).

A message story identifier 1318: identifier values identifying one or more content collections (e.g., "stories") with which a particular content item in the message image payload 1306 of the message 1300 is associated. For example, multiple images within the message image payload 1306 may each be associated with multiple content collections using identifier values.

A message tag 1320: each message 1300 may be tagged with multiple tags, each of which is indicative of the subject matter of content included in the message payload. For example, where a particular image included in the message image payload 1306 depicts an animal (e.g., a lion), a tag value may be included within the message tag 1320 that is indicative of the relevant animal. Tag values may be generated manually, based on user input, or may be automatically generated using, for example, image recognition.

A message sender identifier 1322: an identifier (e.g., a messaging system identifier, email address, or device identifier) indicative of a user of the client device 1010 on which the message 1300 was generated and from which the message 1300 was sent.

A message receiver identifier 1324: an identifier (e.g., a messaging system identifier, email address, or device identifier) indicative of a user of the client device 1010 to which the message 1300 is addressed.

The contents (e.g., values) of the various components of the message 1300 may be pointers to locations in tables within which content data values are stored. For example, an image value in the message image payload 1306 may be a pointer to (or address of) a location within an image table 1208. Similarly, values within the message video payload 1308 may point to data stored within a video table 1210, values stored within the message annotations 1312 may point to data stored in an annotation table 1212, values stored within the message story identifier 1318 may point to data stored in a story table 1206, and values stored within the message sender identifier 1322 and the message receiver identifier 1324 may point to user records stored within an entity table 1202.

Figure 14:
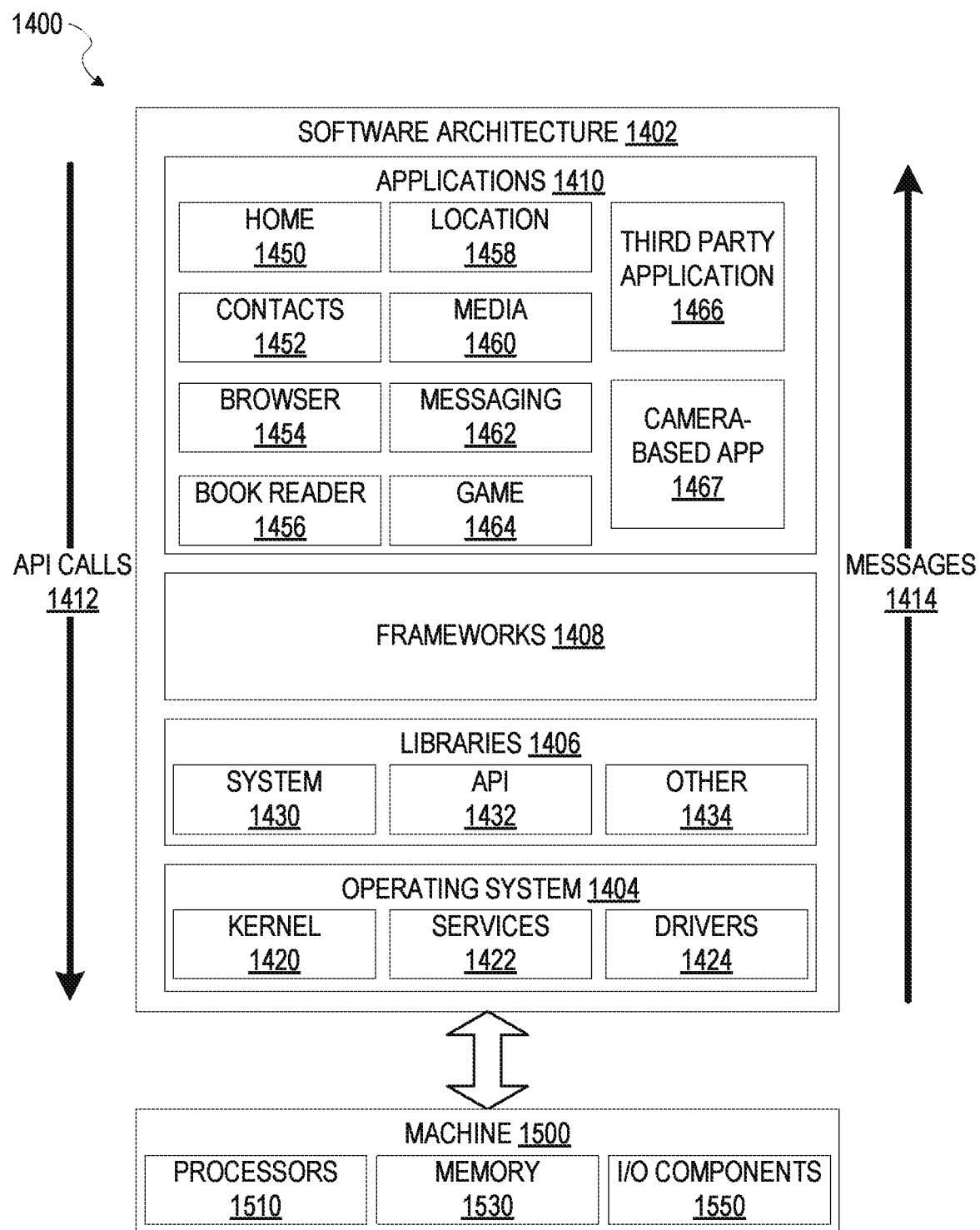
FIG. 14 is a block diagram illustrating an example of a software architecture that may be installed on a machine, according to some example embodiments.

FIG. 14 is a block diagram 1400 illustrating a software architecture 1402, which can be installed on any one or more of the devices described above. For example, in various embodiments, client devices 1010, server system 1008, and servers 1002, 1012, 1016, 1018, 1022, and 1024 may be implemented using some or all of the elements of the software architecture 1402. FIG. 14 is merely a non-limiting example of a software architecture, and it will be appreciated that many other architectures can be implemented to facilitate the functionality described herein. In various embodiments, the software architecture 1402 is implemented by hardware such as machine 1500 of FIG. 15 that includes processors 1510, memory 1530, and I/O components 1550.

In this example, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke API calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third-party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate functionality described herein.

Some embodiments may particularly include a camera-based application 1467. In certain embodiments, this may be a standalone application that operates to manage communications with a server system such as third-party servers or server system 1008. In other embodiments, this functionality may be integrated with another application (e.g., messaging application 1462). The camera-based application 1467 may request and display various data related to messaging, media content, media collections, media overlays, and so forth, and may provide the capability for a user to input data related to the system via a touch interface, keyboard, or using a camera device of the machine 1500, communication with a server system via I/O components 1550, and receipt and storage of object data in memory 1530. Presentation of information and user inputs associated with the information may be managed by the camera-based application 1467 using different frameworks 1408, library 1406 elements, or operating system 1404 elements operating on a machine 1500.

Figure 15:
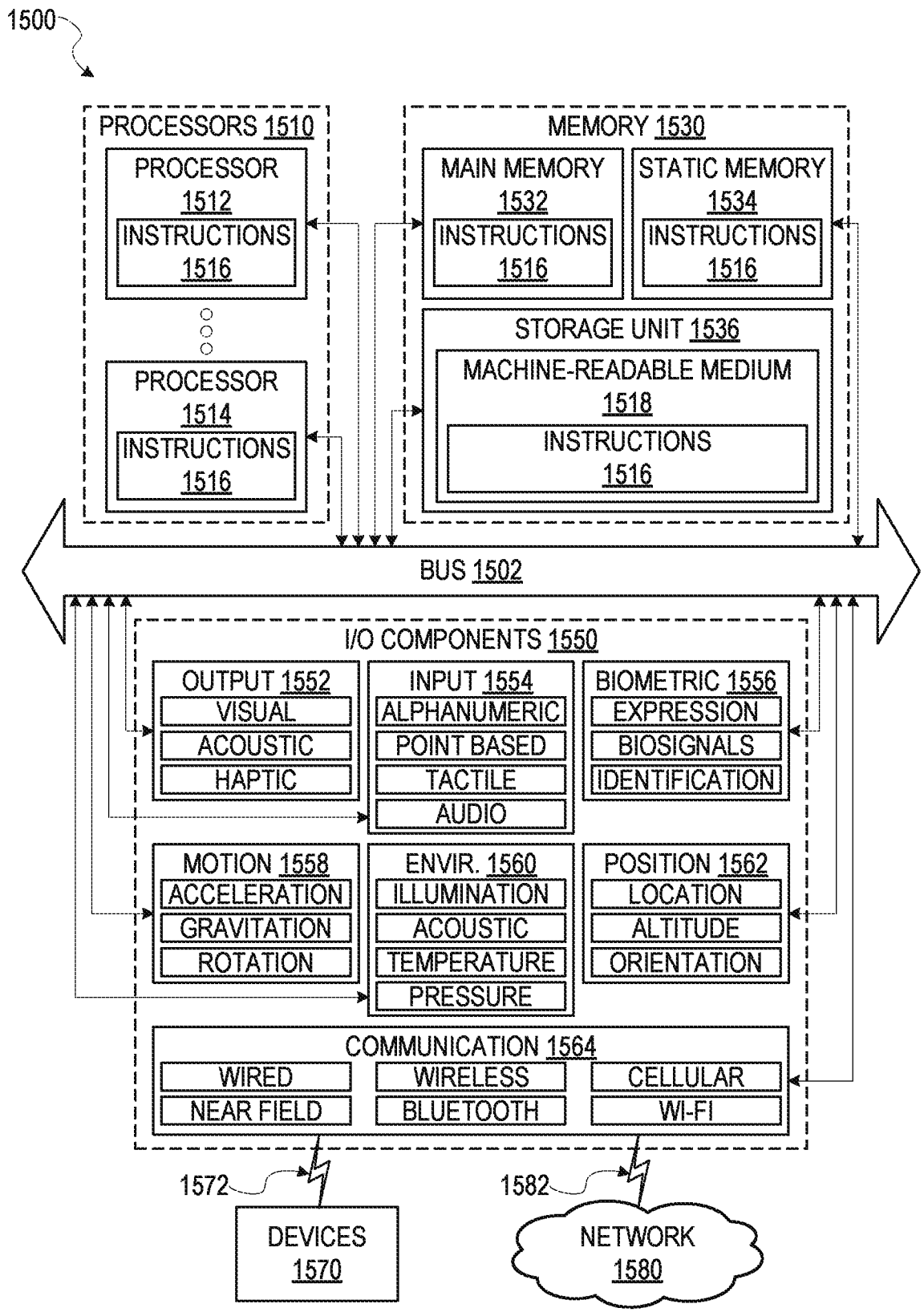
FIG. 15 illustrates a diagrammatic representation of a machine, in the form of a computer system, within which a set of instructions may be executed for causing the machine to perform any one or more of the methodologies discussed herein, according to an example embodiment.

FIG. 15 is a block diagram illustrating components of a machine 1500, according to some embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein can be executed. In alternative embodiments, the machine 1500 operates as a standalone device or can be coupled (e.g., networked) to other machines. In a networked deployment, the machine 1500 may operate in the capacity of a server machine 1008, 1012, 1016, 1022, 1024, and the like, or a client device 1010 in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 15 shows multiple processors 1510, the machine 1500 may include a single processor 1510 with a single core, a single processor 1510 with multiple cores (e.g., a multi-core processor 1510), multiple processors 1512, 1514 with a single core, multiple processors 1512, 1514 with multiple cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1518 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1518.

As used herein, the term "memory" refers to a machine-readable medium 1518 able to store data temporarily or permanently and may be taken to include, but not be limited to, random-access memory (RAM), read-only memory (ROM), buffer memory, flash memory, and cache memory. While the machine-readable medium 1518 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine 1500 or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1518 is non-transitory (in other words, not having any transitory signals) in that it does not embody a propagating signal. However, labeling the machine-readable medium 1518 "non-transitory" should not be construed to mean that the medium is incapable of movement; the medium 1518 should be considered as being transportable from one physical location to another. Additionally, since the machine-readable medium 1518 is tangible, the machine-readable medium 1518 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
generating, from image data received by a computing device, an image pyramid comprising multiple levels of an image in the image data subsampled at various resolutions for each level;
during transfer, to a graphic processing unit (GPU) of the computing device, of image data corresponding to one or more predetermined levels of the image pyramid comprising higher resolution, calculating, by a central processing unit (CPU) of the computing device, optical flow of one or more predetermined coarse levels of the image pyramid;
calculating, by the GPU of the computing device, optical flow of the one or more predetermined levels of the image pyramid comprising higher resolution using the optical flow of the one or more predetermined coarse levels of the image pyramid calculated by the CPU to generate an optical flow of the image data; and
outputting, by the GPU of the computing device, the optical flow of the image data.

2. The method of claim 1, wherein the image data comprises one or more frames of a video stream for a video being captured by a camera of the computing device.

3. The method of claim 1 wherein the image is a frame of a video stream for a video being captured by a camera of the computing device.

4. The method of claim 1, wherein calculating, by the CPU of the computing device, the optical flow of one or more predetermined coarse levels of the image pyramid, comprises:
calculating source image gradients in X and Y direction for every pixel;
dividing the image into a grid of patches;
calculating a sum of gradients for each patch;
calculating an inverse Hessian matrix;
setting an initial flow field;
performing an iterative patch search; and
calculating a pixel-wise flow field.

5. The method of claim 1, wherein calculating, by the CPU of the computing device, the optical flow of one or more predetermined coarse levels of the image pyramid, comprises, for each level:
preprocessing image gradients;
performing patch-wise optical flow; and
performing dense optical flow from the patch-wise optical flow.

6. The method of claim 5, wherein performing patch-wise optical flow comprises performing iterative inverse patch search based on inverse composition for every patch of the level to find an incremental optical flow in X and Y direction for the image.

7. The method of claim 6 wherein, performing iterative inverse patch search comprises calculating a cost of patch matching and wherein calculating the cost of patch matching is implemented on a single instruction multiple data (SIMD).

8. The method of claim 5, wherein performing dense optical flow comprises a process of evaluating a pixel difference cost using a neighbor optical flow output and wherein the process is implemented on a single instruction multiple data (SIMD) by generating four bilinear interpolated pixels at a time.

9. The method of claim 6, wherein performing iterative inverse patch search comprises:
(a) determining a pixel difference between the image and a previous frame;
(b) using the pixel difference to calculate the difference in X and Y motion vectors;
(c) updating X and Y;
(d) determining whether a pixel cost is less than a predetermined threshold; and
(e) returning to step (a) if the pixel cost is not less than the predetermined threshold.

10. The method of claim 1, wherein calculating, by the GPU of the computing device, the optical flow of the one or more predetermined levels of the image pyramid comprising higher resolution comprises, for each level in parallel:
preprocessing image gradients;
performing patch-wise optical flow;
performing neighbor synchronization; and
performing dense optical flow from the patch-wise optical flow.

11. The method of claim 10, wherein performing neighbor synchronization comprises:
for a given patch of a plurality of patches in a layer of the image pyramid:
determining all neighbor patches for the given patch;
determining a cost value given by a cost function for each neighbor patch motion vector value;
comparing each neighbor patch cost value to a cost value of the given patch; and
updating the vector value of the given patch if any neighbor patch cost value is less than the cost value of the given patch, wherein the vector value of the given patch is updated to comprise a neighbor patch motion vector value with a lowest cost value.

12. A computing device comprising:
a memory that stores instructions; and
one or more hardware processors configured by the instructions to perform operations comprising:
generating, from image data received by the computing device, an image pyramid comprising multiple levels of an image in the image data subsampled at various resolutions for each level;
during transfer, to a graphic processing unit (GPU) of the computing device, of image data corresponding to one or more predetermined levels of the image pyramid comprising higher resolution, calculating, by a central processing unit (CPU) of the computing device, optical flow of one or more predetermined coarse levels of the image pyramid;
calculating, by the GPU of the computing device, optical flow of the one or more predetermined levels of the image pyramid comprising higher resolution using the optical flow of the one or more predetermined coarse levels of the image pyramid calculated by the CPU to generate an optical flow of the image data; and
outputting, by the GPU of the computing device, the optical flow of the image data.

13. The computing device of claim 12, wherein calculating, by the CPU of the computing device, the optical flow of one or more predetermined coarse levels of the image pyramid, comprises, for each level:
preprocessing image gradients;
performing patch-wise optical flow; and
performing dense optical flow from the patch-wise optical flow.

14. The computing device of claim 13, wherein performing patch-wise optical flow comprises performing iterative inverse patch search based on inverse composition for every patch of the level to find an incremental optical flow in X and Y direction for the image.

15. The computing device of claim 14 wherein, performing iterative inverse patch search comprises calculating a cost of patch matching and wherein calculating the cost of patch matching is implemented on a single instruction multiple data (SIMD).

16. The computing device of claim 13, wherein performing dense optical flow comprises a process of evaluating a pixel difference cost using a neighbor optical flow output and wherein the process is implemented on a single instruction multiple data (SIMD) by generating four bilinear interpolated pixels at a time.

17. The computing device of claim 14, wherein performing iterative inverse patch search comprises:
   (a) determining a pixel difference between the image and a previous frame;
   (b) using the pixel difference to calculate the difference in X and Y motion vectors;
   (c) updating X and Y;
   (d) determining whether a pixel cost is less than a predetermined threshold; and
   (e) returning to step (a) if the pixel cost is not less than the predetermined threshold.

18. The computing device of claim 12, wherein calculating, by the GPU of the computing device, the optical flow of the one or more predetermined levels of the image pyramid comprising higher resolution comprises, for each level in parallel:
   preprocessing image gradients;
   performing patch-wise optical flow;
   performing neighbor synchronization; and
   performing dense optical flow from the patch-wise optical flow.

19. The computing device of claim 18, wherein performing neighbor synchronization comprises:
   for a given patch of a plurality of patches in a layer of the image pyramid:
   determining all neighbor patches for the given patch;
   determining a cost value given by a cost function for each neighbor patch motion vector value;
   comparing each neighbor patch cost value to a cost value of the given patch; and
   updating the vector value of the given patch if any neighbor patch cost value is less than the cost value of the given patch, wherein the vector value of the given patch is updated to comprise a neighbor patch motion vector value with a lowest cost value.

20. A non-transitory computer-readable medium comprising instructions stored thereon that are executable by at least one processor to cause a computing device to perform operations comprising:
   generating, from image data received by the computing device, an image pyramid comprising multiple levels of an image in the image data subsampled at various resolutions for each level;
   during transfer, to a graphic processing unit (GPU) of the computing device, of image data corresponding to one or more predetermined levels of the image pyramid comprising higher resolution, calculating, by a central processing unit (CPU) of the computing device, optical flow of one or more predetermined coarse levels of the image pyramid;
   calculating, by the GPU of the computing device, optical flow of the one or more predetermined levels of the image pyramid comprising higher resolution using the optical flow of the one or more predetermined coarse levels of the image pyramid calculated by the CPU to generate an optical flow of the image data; and
   outputting, by the GPU of the computing device, the optical flow of the image data.

* * * * *